US011831272B2

(12) United States Patent
Shtein et al.

(10) Patent No.: US 11,831,272 B2
(45) Date of Patent: Nov. 28, 2023

(54) KIRIGAMI-BASED MULTI-AXIS TRACKING DEVICES AND SYSTEMS

(71) Applicant: The Regents of the University of Michigan, Ann Arbor, MI (US)

(72) Inventors: Max Shtein, Ann Arbor, MI (US); Erin Evke, Ann Arbor, MI (US); Michael Arwashan, Ann Arbor, MI (US); Chao Huang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 3 days.

(21) Appl. No.: 17/396,110

(22) Filed: Aug. 6, 2021

(65) Prior Publication Data

US 2022/0045644 A1 Feb. 10, 2022

Related U.S. Application Data

(60) Provisional application No. 63/062,230, filed on Aug. 6, 2020.

(51) Int. Cl.
*H02S 20/32* (2014.01)
*F24S 50/80* (2018.01)
*F24S 50/20* (2018.01)
*F24S 30/00* (2018.01)

(52) U.S. Cl.
CPC .............. *H02S 20/32* (2014.12); *F24S 50/20* (2018.05); *F24S 50/80* (2018.05); *F24S 2030/10* (2018.05)

(58) Field of Classification Search
None
See application file for complete search history.

(56) References Cited

U.S. PATENT DOCUMENTS

| | | | | |
|---|---|---|---|---|
| 1,162,230 | A * | 11/1915 | Foster | G09F 7/00 283/105 |
| 4,637,192 | A * | 1/1987 | Brown | E04H 12/18 52/646 |
| 6,200,656 | B1 * | 3/2001 | Tsang | A41G 1/007 428/20 |
| 6,936,314 | B1 * | 8/2005 | Schultz | A41G 1/007 428/7 |

(Continued)

FOREIGN PATENT DOCUMENTS

| | | | |
|---|---|---|---|
| WO | 2020102527 A1 | 5/2020 | |
| WO | WO-2020102527 A1 * | 5/2020 | ............. G01D 11/30 |

OTHER PUBLICATIONS

"Kirigami-Based Multi-Axis Tracking System", University of Michigan, Tech Transfer, Oct. 21, 2020, 2 pages.

(Continued)

*Primary Examiner* — Avinash A Savani
*Assistant Examiner* — Deepak A Deean
(74) *Attorney, Agent, or Firm* — Lempia Summerfield Katz LLC

(57) ABSTRACT

A device includes a support structure having a plurality of concentric cuts through the support structure that define a set of structure sections. The device also includes an insert assembly supported by the support structure at an inner structure section of the set of structure sections. The inner structure section is configured to tilt the insert assembly at a tilt angle in accordance with a displacement of a first outer structure section of the set of structure sections.

25 Claims, 30 Drawing Sheets

(56) References Cited

U.S. PATENT DOCUMENTS

| | | | | |
|---|---|---|---|---|
| 8,689,514 | B1* | 4/2014 | Sternowski | H01Q 1/288 |
| | | | | 52/646 |
| 10,637,391 | B2* | 4/2020 | Forrest | H02S 30/20 |
| 10,932,361 | B2* | 2/2021 | Pan | H05K 1/0283 |
| 2015/0303867 | A1 | 10/2015 | Angel et al. | |
| 2016/0136877 | A1 | 5/2016 | Rogers et al. | |
| 2016/0285410 | A1* | 9/2016 | Forrest | H02S 20/32 |
| 2016/0299270 | A1 | 10/2016 | Kotov et al. | |
| 2017/0182723 | A1 | 6/2017 | Calisch et al. | |
| 2017/0297058 | A1 | 10/2017 | Jiang et al. | |
| 2020/0025618 | A1* | 1/2020 | Kotov | G01J 3/42 |
| 2020/0231430 | A1* | 7/2020 | Mhatre | B32B 7/08 |
| 2020/0386892 | A1* | 12/2020 | Kotov | G01S 17/89 |
| 2021/0095369 | A1* | 4/2021 | Nam | C23C 16/01 |
| 2022/0003577 | A1* | 1/2022 | Evke | G01L 1/2287 |

OTHER PUBLICATIONS

International Search Report and Written Opinion of the International Searching Authority in International Patent Application No. PCT/US2021/044983, dated Nov. 22, 2021, 10 pages.

A. Lamoureux, K. Lee, M. Shlian, S.R. Forrest, M. Shtein, Dynamic kirigami structures for integrated solar tracking; Nat. Comm. 2015, vol. 6, 6 pp.

A. Lamoureux, Origami and Kirigami Design Principles for Optical Tracking, Energy Harvesting, and Other Applications; Thesis, University of Michigan, 2017; 112 pp.

A. Rafsanjani, Y. Zhang, B. Liu, S.M. Rubinstein, K. Bertoldi, Kirigami skins make a simple soft actuator crawl; Sci. Robot. 2018, 3, eaar7555; 7 pp.

A.J. Grede, J.S. Price, N.C. Giebink, Fundamental and practical limits of planar tracking solar concentrators; Opt. Express. 2016, 24, A1635; 12 pp.

B. Gao, A. Elbaz, Z. He, Z. Xie, H. Xu, S. Liu, E. Su, H. Liu, Z. Gu; Bioinspired Kirigami Fish-Based Highly Stretched Wearable Biosensor for Human Biochemical-Physiological Hybrid Monitoring; Adv. Mater. Technol. 2018, vol. 3, 1700308, 8 pp.

B. Kim et al.; Mechanically Guided Post-Assembly of 3D Electronic Systems; Adv. Funct. Mater. 2018, vol. 28, 1803149; 10 pp.

B. Lee, D. Fan, S.R. Forrest, A high throughput, linear molecular beam epitaxy system for reduced cost manufacturing of GaAs photovoltaic cells: will GaAs ever be inexpensive enough?; Sustain. Energy Fuels 2020, 4, 8 pp.

Best Research-Cell Efficiency Chart; National Renewable Energy Laboratory; 2020; https://www.nrel.gov/pv/cell-efficiency.html; 6 pp.

C.-H. Lin, D.-S. Tsai, T.-C. Wei, D.-H. Lien, J.-J. Ke, C.-H. Su, J.-Y. Sun, Y.-C. Liao, J.-H. He, Highly Deformable Origami Paper Photodetector Arrays; ACS Nano. 2017, 11, 10230; 6 pp.

C.-Y. Lee, P.-C. Chou, C.-M. Chiang, C.-F. Lin, Sun Tracking Systems: A Review; Sensors 2009, 9, 16 pp.

Chih-Wei Chien, Kyusang Lee, M. Shlian, S. Forrest, M. Shtein, P.C. Ku, Flat-plate photovoltaics with solar-tracking origami microconcentrator arrays; 2015 IEEE 42nd PVSC, 2015, 5 pp.

D.G. Hwang, M.D. Bartlett, Tunable Mechanical Metamaterials through Hybrid Kirigami Structures; Sci. Rep. 2018, 8, 8 pp.

E.E. Evke, D. Meli, M. Shtein, Developable Rotationally Symmetric Kirigami-Based Structures as Sensor Platforms; Adv. Mater. Technol. 2019, 4, 1900563; 7 pp.

F. Duerr, Y. Meuret, H. Thienpont, Tracking integration in concentrating photovoltaics using laterally moving optics; Opt. Express. 2011, 19, A207; 12 pp.

H. Apostoleris, M. Stefancich, M. Chiesa, Tracking-integrated systems for concentrating photovoltaics; Nat. Energ. 2016, 1, 8 pp.

Hu, N. et al.; Stretchable Kirigami Polyvinylidene Difluoride Thin Films for Energy Harvesting: Design, Analysis, and Performance; Phys. Rev. Appl. 9, 2018, 6 pp.

J.F. Geisz, R.M. France, K.L. Schulte, M.A. Steiner, A.G. Norman, H.L. Guthrey, M.R. Young, T. Song, T. Moriarty, Six-junction III-V solar cells with 47.1% conversion efficiency under 143 Suns concentration; Nat. Energy 2020, 5, 10 pp.

J.S. Price, X. Sheng, B.M. Meulblok, J.A. Rogers, N.C. Giebink, Wide-angle planar microtracking for quasi-static microcell concentrating photovoltaics; Nat. Comm. 2015, 6, 8 pp.

K. Gustafson, O. Angatkina, A. Wissa, Model-based design of a multistable origami-enabled crawling robot; Smart Mater. Struct. 2019, 29, 015013; 9 pp.

K. Lee, C.-W. Chien, B. Lee, A. Lamoureux, M. Shlian, M. Shtein, P.C. Ku, S. Forrest, Origami Solar-Tracking Concentrator Array for Planar Photovoltaics; ACS Photonics 2016, 3, 22 pp.

K. Zhang, Y.H. Jung, S. Mikael, J.-H. Seo, M. Kim, H. Mi, H. Zhou, Z. Xia, W. Zhou, S. Gong, Z. Ma, Origami silicon optoelectronics for hemispherical electronic eye systems; Nat. Comm. 2017, vol. 8, 8 pp.

Jing, Z. Wang, B. Zheng, H. Wang, Y. Yang, L. Shen, W. Yin, E. Li, H. Chen, Kirigami metamaterials for reconfigurable toroidal circular dichroism; NPG Asia Mater 2018, 10, 11 pp.

L. Lisell, T. Tetreault, A. Watson, Solar Ready Buildings Planning Guide, National Renewable Energy Laboratory, 2009, 33 pp.

Xu, X. Wang, Y. Kim, T.C. Shyu, J. Lyu, N.A. Kotov, Kirigami Nanocomposites as Wide-Angle Diffraction Gratings; ACS Nano 2016, 10, 7 pp.

M. Blees et al.; Graphene kirigami; Nature 2015, vol. 524, 9 pp.

M. Jo, S. Bae, I. Oh, J. Jeong, B. Kang, S.J. Hwang, S.S. Lee, H.J. Son, B.-M. Moon, M.J. Ko, P. Lee, 3D Printer-Based Encapsulated Origami Electronics for Extreme System Stretchability and High Areal Coverage; ACS Nano 2019, 13, 12500; 31 pp.

M. Woodhouse, B. Smith, A. Ramdas, R. Margolis, Crystalline Silicon Photovoltaic Module Manufacturing Costs and Sustainable Pricing: 1H 2018 Benchmark and Cost Reduction Road Map, National Renewable Energy Laboratory, 2019, 58 pp.

N. Sellami, T.K. Mallick, Optical efficiency study of PV Crossed Compound Parabolic Concentrator; Appl. Energ. 2013, 102, 9 pp.

P. Gagnon, R. Margolis, J. Melius, C. Phillips, R. Elmore, Rooftop Solar Photovoltaic Technical Potential in the United States: A Detailed Assessment, National Renewable Energy Laboratory, 2016; 82 pp.

Q. Qiao, J. Yuan, Y. Shi, X. Ning, F. Wang, Structure, Design, and Modeling of an Origami-Inspired Pneumatic Solar Tracking System for the NPU-Phonesat; J. Mech. Robot. 2017, vol. 9; 6pp.

Residential Energy Consumption Survey: Electric Sales, Revenue, and Average Price, Table 5.a, U.S. Energy Information Administration, 2019, https://www.eia.gov/electricity/sales_revenue_price/; 2 pp.

S. Yao, X. Liu, S.V. Georgakopoulos, M.M. Tentzeris, A novel reconfigurable origami spring antenna; 2014 IEEE Antennas and Propagation Society International Symposium (APSURSI), 2014, 2 pp.

S.A. Zirbel, R.J. Lang, M.W. Thomson, D.A. Sigel, P.E. Walkemeyer, B.P. Trease, S.P. Magleby, L.L. Howell, Accommodating Thickness in Origami-Based Deployable Arrays; J. Mech. Des. 2013, 135; 11 pp.

T. C. Shyu et al.; A kirigami approach to engineering elasticity innanocomposites through patterned defects; Nat. Mater. 2015, vol. 14, 6 pp.

T.J. Silverman, M.G. Deceglie, B. Marion, S. Cowley, B. Kayes, S. Kurtz, Outdoor performance of a thin-film gallium-arsenide photovoltaic module; 2013 IEEE 39th PVSC, 2013, 6 pp.

W. Nsengiyumva, S.G. Chen, L. Hu, X. Chen, Recent advancements and challenges in Solar Tracking Systems (STS): A review; Renew. Sust. Energ. Rev. 2018, 81, 30 pp.

W. Wang, C. Li, H. Rodrigue, F. Yuan, M.-W. Han, M. Cho, S.-H. Ahn, Kirigami/Origami-Based Soft Deployable Reflector for Optical Beam Steering; Adv. Funct. Mater. 2017, 27, 1604214; 9 pp.

W.J. Choi, G. Cheng, Z. Huang, S. Zhang, T.B. Norris, N.A. Kotov, Terahertz circular dichroism spectroscopy of biomaterials enabled by kirigami polarization modulators; Nat. Mater. 2019, 18, 7 pp.

X. Ning, X. Wang, Y. Zhang, X. Yu, D. Choi, N. Zheng, D.S. Kim, Y. Huang, Y. Zhang, J.A. Rogers, Assembly of Advanced Materials into 3D Functional Structures by Methods Inspired by Origami and Kirigami: A Review; Adv. Mater. Int. 2018, 5, 1800284; 13 pp.

(56) References Cited

OTHER PUBLICATIONS

Y. Chen, Y. Lu, M. Liao, Y. Tian, Q. Liu, C. Gao, X. Yang, C. Shan, 3D Solar-Blind Ga2O3 Photodetector Array Realized Via Origami Method; Adv. Funct. Mater. 2019, 29, 1906040; 8 pp.
Y. Tang, G. Lin, S. Yang, Y.K. Yi, R.D. Kamien, J. Yin, Programmable Kiri-Kirigami Metamaterials; Adv. Mater. 2017, 29, 1604262; 9 pp.
Y. Tang, Y. Li, Y. Hong, S. Yang, J. Yin, Programmable active kirigami metasheets with more freedom of actuation; Proc. Natl. Acad. Sci. USA 2019, 116, 26407; 7 pp.
Y. Yamamoto, S. Harada, D. Yamamoto, W. Honda, T. Arie, S. Akita, K. Takei; Printed multifunctional flexible device with an integrated motion sensor for health care monitoring; Sci. Adv. 2016, vol. 2, e1601473; 9 pp.
Z. Liu, H. Du, J. Li, L. Lu, Z.-Y. Li, N.X. Fang, Nano-kirigami with giant optical chirality; Sci. Adv. 2018, 4, eaat4436; 8 pp.

\* cited by examiner

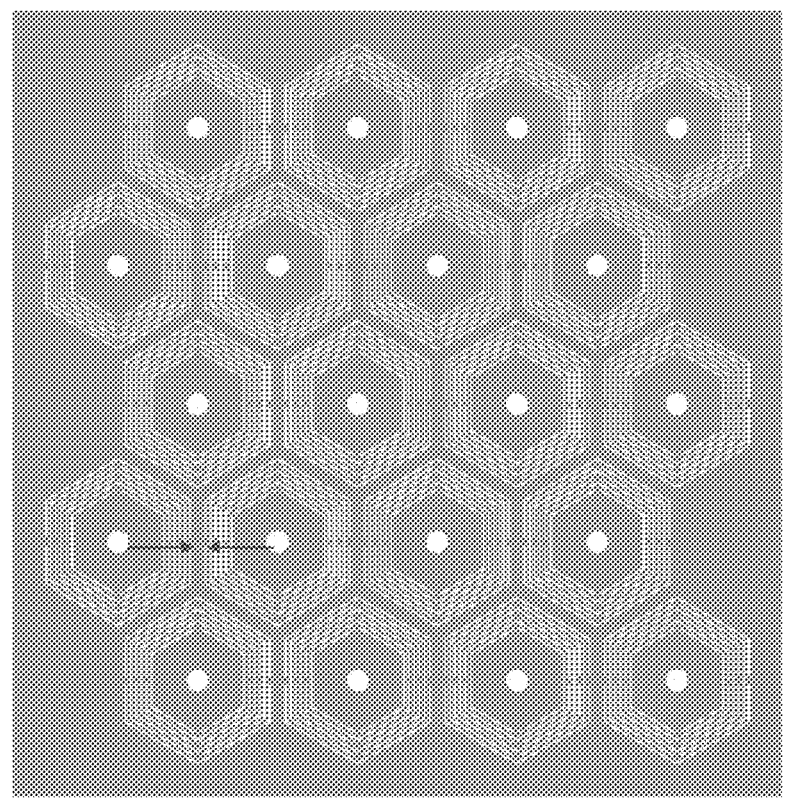
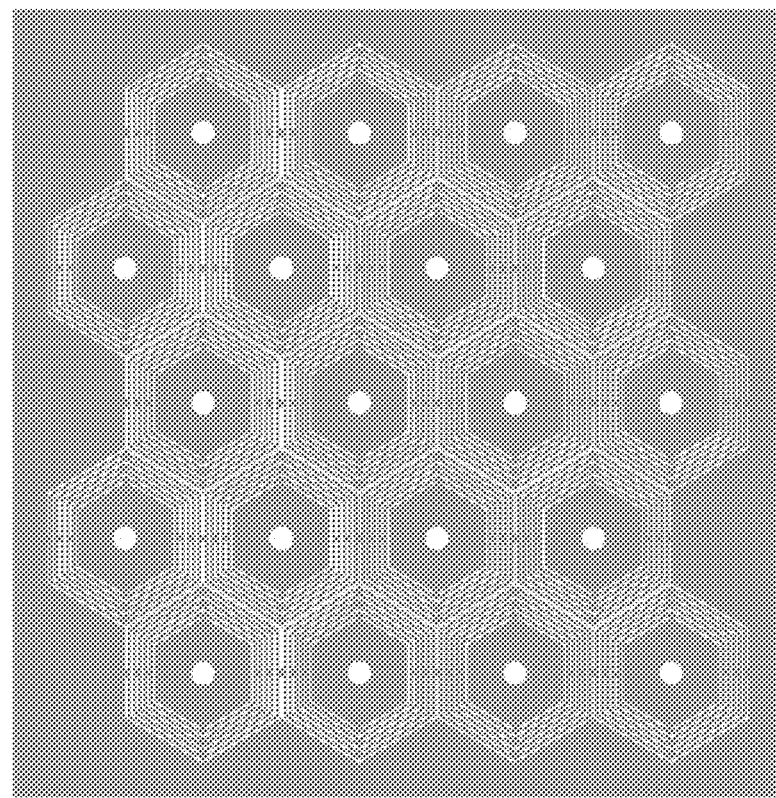
FIG. 15

KIRIGAMI-BASED MULTI-AXIS TRACKING DEVICES AND SYSTEMS

CROSS-REFERENCE TO RELATED APPLICATION

This application claims the benefit of U.S. provisional application entitled "Kirigami-Based Multi-Axis Tracking Devices and Systems," filed Aug. 6, 2020, and assigned Ser. No. 63/062,230, the entire disclosure of which is hereby expressly incorporated by reference.

STATEMENT REGARDING FEDERALLY SPONSORED RESEARCH OR DEVELOPMENT

This invention was made with government support under Contract No. 1240264 awarded by the National Science Foundation. The government has certain rights in the invention.

BACKGROUND OF THE DISCLOSURE

Field of the Disclosure

The disclosure generally relates to devices and systems for multi-axis tracking.

Brief Description of Related Technology

The ancient Japanese arts of origami (folding) and kirigami (cutting) have provided a versatile conceptual framework for transforming relatively easily manufactured two-dimensional patterns into three-dimensional structures that would be difficult to produce using other approaches. Kirigami has been increasingly used as a design tool for fabricating materials with greater flexibility and range of geometric transformation, which has been leveraged for a number of applications. Kirigami structures have been shown to be advantageous for their high stretchability, facile processability, low-weight, cost-effectiveness, and high tunability of properties. Numerous elegant solutions using simple, linear cut patterns have been demonstrated to long-standing problems in a variety of fields including soft robotics, health monitoring, optical tracking, antennas, flexible electronics, optical beam steering, photonic applications, such as nano-photonics, and solar energy harvesting, among others.

In solar energy harvesting, for example, despite steady advances in the efficiency of photovoltaic devices, widespread adoption of ultra-high efficiency materials remains limited due to the high cost of high-efficiency semiconductor photovoltaic (PV) cells. Concentrated photovoltaic (CPV) systems reduce semiconductor requirements. However, most designs have a narrow acceptance angle. Typically, for an imaging-type concentrator, an acceptance angle is a function of a concentration factor (CF), where the greater the CF, the narrower the acceptance angle. Therefore, most designs require precise tracking. Conventional trackers used to achieve the required tracking precision are large, heavy, complex, costly, and unsuitable for deployment in many desirable locations including residential rooftops. Thus, a number of approaches have been proposed to address the limitations of narrow acceptance angle, tracking ability, and cost. One proposal involved a concentrator shape that maintains over 90% optical efficiency over 140 degrees. Microcell arrays have also been proposed to reduce concentrator cost and weight. Origami and kirigami techniques have also been shown to overcome some limitations of existing trackers, including miura-ori and "flasher" origami patterns as deployable solar arrays. However, many of these patterns require more semiconductor material than conventional panels, are not easily manufacturable due to the intricate folds required, and exhibit poor fatigue performance.

SUMMARY OF THE DISCLOSURE

In accordance with one aspect of the disclosure, a device includes a support structure having a plurality of concentric cuts through the support structure that define a set of structure sections. The device also includes an insert assembly supported by the support structure at an inner structure section of the set of structure sections. The inner structure section is configured to tilt the insert assembly at a tilt angle in accordance with a displacement of a first outer structure section of the set of structure sections.

In accordance with another aspect of the disclosure, a tracking system includes a processor, a memory in which tracking instructions, emission source data, and calibration data are stored, a plurality of tracking modules, and an actuator coupled to the plurality of tracking modules. Each tracking module of the plurality of tracking modules includes a kirigami support structure having a plurality of concentric cuts through the kirigami support structure. The kirigami support structure has a base portion and a top portion parallel to the base portion. Each tracking module of the plurality of tracking modules further includes an insert assembly supported by the kirigami support structure between the top portion of the kirigami support structure and the base portion of the kirigami support structure. The insert assembly includes a concentrator and an active device, the concentrator being a reflective device configured to concentrate emissions from a source to a focal point. The active device is positioned at the focal point and configured to capture the concentrated emissions. Execution of the tracking instructions by the processor causes the actuator to displace the plurality of tracking modules based on the emission source data and calibration data.

In accordance with another aspect of the disclosure, a solar tracking device includes a kirigami spring having a plurality of concentric cuts that define a cone-shaped structure, a concentrator supported by a middle portion of the kirigami spring, a solar sensor arranged in a central portion of the concentrator, and a panel coupled to a top surface of the kirigami spring. A bottom portion of the kirigami spring is configured to translate along a plane parallel to the panel in one or more lateral directions. The concentrator and the solar sensor are configured to tilt at a tilt angle along one or more axes depending on a translation of the bottom portion of the kirigami spring, such that the solar sensor is operable to track solar radiation.

In connection with any one of the aforementioned aspects, the devices and systems described herein may alternatively or additionally include any combination of one or more of the following aspects or features. The first outer structure section is configured to be displaced in one or more lateral directions. The inner structure section is configured to be deformed based on a displacement of the first outer structure section. The insert assembly is configured to tilt along one or more axes based on a deformation of the inner structure section. The first outer structure section is planar shaped. The one or more lateral directions are along a plane of the first outer structure section. The device further includes a second outer structure section of the set of structure sections parallel to the first outer structure section. The first or second outer structure section is a fixed outer structure section and the other outer structure section of the first or second outer structure section is configured to be displaced in one or more lateral directions relative to the fixed outer structure section. The insert assembly is configured to tilt to perform optical tracking. The optical tracking is solar tracking. The insert assembly includes an active device and a concentrator, the concentrator being a reflective device configured to concentrate emissions from a source to a focal point. The active device of the insert assembly is positioned at the focal point and configured to capture the concentrated emissions. The concentrator and the plurality of concentric cuts have a common central axis. A geometry of the concentrator corresponds to a geometry of the inner structure section, such that the inner structure section is configured to receive the concentrator. The support structure includes a compliant mechanism having a collapsible cone-like spring structure. The active device includes a photovoltaic cell. The insert assembly includes an emission device and a reflector, the reflector being a reflective device configured to reflect emissions from the emission device. The emission device includes a light emitting diode. The emission device includes an acoustic transmitter. The insert assembly includes a lens, the lens being configured to focus emissions from a source to a focal area. The device further includes an active device positioned at the focal area and configured to capture the focused emissions. The focal area is positioned on the first outer structure section. The displacement of the plurality of tracking modules includes a lateral displacement of the base portion of the kirigami support structure or the top portion of the kirigami support structure in one or more lateral directions, such that the insert assembly is operable to tilt along one or more axes. The tracking system further includes a plurality of electrodes connecting respective active devices and respective kirigami support structures of the plurality of tracking modules, the plurality of electrodes being routed between adjacent cuts of the plurality of concentric cuts of the respective kirigami support structures, and/or along a section of the support structure (e.g. the inner section). The active device includes a photovoltaic cell. The plurality of electrodes are configured to transmit electricity generated by the respective active devices of the plurality of tracking modules. The tracking system further including a first transparent pane attached to the top portion of the kirigami support structure and a second transparent pane attached to the base portion of the kirigami support structure.

BRIEF DESCRIPTION OF THE DRAWING FIGURES

For a more complete understanding of the disclosure, reference should be made to the following detailed description and accompanying drawing figures, in which like reference numerals identify like elements in the figures.

FIG. 15 illustrates kirigami-based arrays having different spacing parameters in accordance with two examples.

Figure 1:
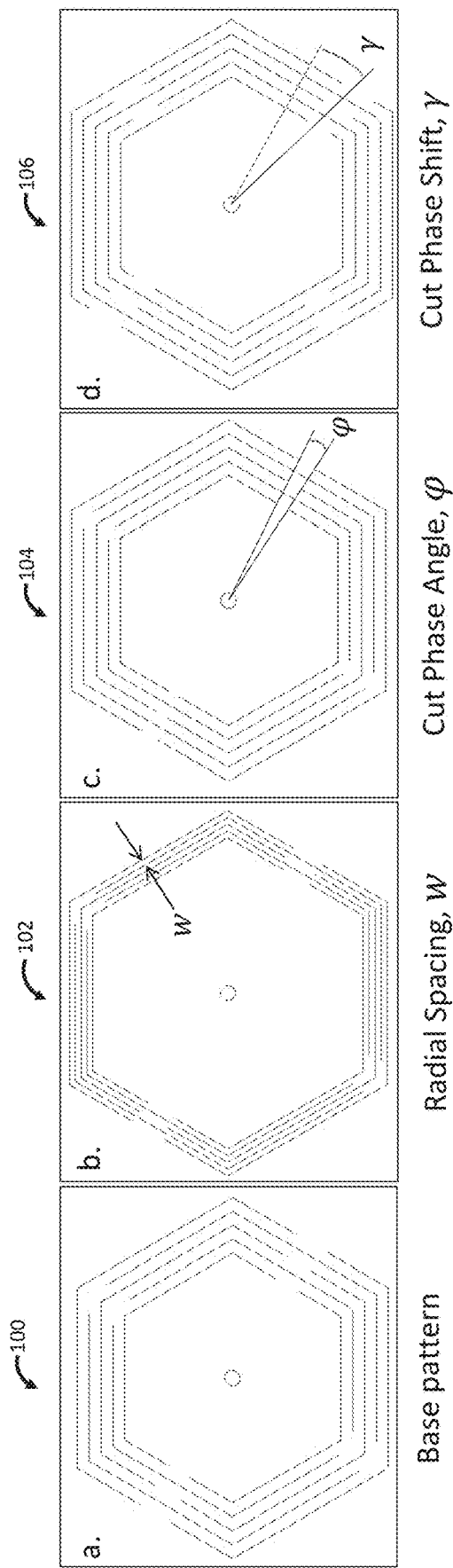
FIG. 1 shows two-dimensional kirigami cut patterns in accordance with several examples.

While the disclosed devices and systems are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF THE DISCLOSURE

Kirigami-based devices and systems for tracking are described. The devices include a support structure with a plurality of concentric cuts (e.g., straight or curvilinear cuts) to define a set of structure sections. An insert assembly may be positioned within, and supported by, an inner or middle structure section of the set of structure sections. The insert assembly is tilted by the structure section supporting the insert assembly based on a displacement of another structure section. For example, an outer structure section may be displaced in a lateral direction. Displacement of an outer structure section causes other structure sections, such as the middle or inner structure section, to deform. When the structure section supporting the insert assembly deforms, the insert assembly tilts in accordance with that deformation.

The plurality of cuts may be arranged in a two-dimensional kirigami cut pattern such that the structure sections may deform into a series of alternating sections, or saddles, between the cuts upon application of force perpendicular to the original plane of the material in which the cuts are made. As a result, the support structure may substantially transform from a two-dimensional structure into a three-dimensional, one-piece spring-like structure. In this regard, the support structure may be a flexible structure that uses its structural elastic body deformation as a function (e.g., a compliant mechanism). The kirigami-like support structures may be symmetrical (e.g., possessing a rotational symmetry, reflection symmetry, inversion symmetry, etc.). Devices or inserts may be positioned within, and supported by, the set of saddles, or structure sections, which together form a structural lattice. Displacement of the innermost or outermost section, or ring, of the deformed kirigami structure causes structural elements of the lattice to bend and tilt simultaneously. As a result, devices or inserts supported within these bending and tilting structural elements will also tilt accordingly. Given the spring-like shape of the support structure, displacement may occur in more than one direction. Thus, the device or insert placed within the support structure may tilt along multiple axes. In the field of tracking devices, the ability to track along multiple axes provides an enormous benefit. With solar tracking, for example, a single axis tracker may be able to track the daily east-west motion of the sun, but a multiple axis tracker may also be able to account for the seasonal north-south motion of the sun.

The disclosed devices and systems are useful in a number of different applications. The selection of the insert or device is dictated by the desired application, with geometric parameters and material choice dictated by the application requirements. One example application or use scenario is optical tracking, and in particular, solar energy harvesting, or solar tracking. In this case, the three-dimensional spring-like support structure, in combination with inserts, such as a lens or a concentrator and solar cell, creates a mechanism for tilting the inserts and, for example, using the effect for tracking a source of radiation (e.g., the sun). Actuating the innermost or outermost portions of the support structure produces a tilt of the concentrator-solar cell or lens assembly that depends on the amount and direction of relative lateral displacement of the portions of the kirigami shape. Having a structure designed and configured for multi-axes tilting allows for optical tracking over an increased angle sweep in two axes. This allows for a greater concentration of captured radiation as compared to stationary solar panels. This type of diurnal tracking (e.g., tracking during the day) may account for up to approximately 40% more energy collection. However, conventional solar tracking structures are costly and complex. The disclosed structure can be scaled easily to an arbitrarily large or miniature array, yet the displacement required to achieve the angular sweep remains compact and independent of the number of elements and areal extent of the array. For example, an array comprised of the disclosed structure may be as small as a cell phone or as large as a football field. Smaller and larger arrays are possible.

Kirigami (i.e., the Japanese art of cutting) is used to engineer elasticity in the disclosed support structure. The cutting allows for greater control over the geometric design and device behavior. Various technologies (e.g. laser cutting, die cutting, printing, vapor coating, etc.) may be used to generate the two-dimensional patterns, with or without functional coatings, and thereby achieve device properties and performance in 2D-to-3D transformations via kirigami techniques. Curvilinear, piecewise linear, and other cut patterns may be used.

The kirigami-based nature of the disclosed devices and systems may be used as a tool to geometrically manipulate the global structure and properties of materials. The kirigami support structures may be discretized or otherwise considered as a series of beams. In this view, the segments between cuts act as hinges that cause the beams to bend out of plane with an applied stress. As a kirigami support structure is deformed, the beams defined by the cut lengths bend out of plane, creating a collection of saddle points with alternating positive and negative curvatures, enabling the structure to achieve large deflections. The kirigami cut parameters, such as radial spacing, phase angle, and number of cuts along a perimeter (as shown in FIG. 1), dictate the geometry of the beams and structure sections, as well as their deformation behavior. The basic mechanics of the kirigami support structure can be understood using cantilever beam theory. When increasing the radial spacing and phase angle, the beams become wider and shorter, respectively. Doing so increases the stiffness of the beam. For instance, shortening the length of the beam decreases the distance between the two pivot points, which increases the tilt angle. However, a trade-off exists between the height of the kirigami spring-like structure and the tilt angle. If the height of the spring is too short, the concentrator may encounter the base, restricting further tilting.

Although described below in connection with a number of examples involving solar tracking, the disclosed devices and systems are also useful in various other applications. For example, the disclosed devices and systems may be used in various emissive/transmissive and/or collector/receiver applications such as optical and acoustic applications. Other types of energy or wave-based applications may benefit as well, such as laser tracking using a photodiode, tracking light emissions for range or distance purposes (e.g., depth perception, time-of-flight, and LiDAR), acoustic emissions, pressure signals, and radio-waves, among others.

FIG. 1 shows two-dimensional kirigami cut patterns in accordance with several examples. As shown in FIG. 1, the example cut patterns include a plurality of cuts that share a common axis, such that the plurality of cuts has a substantially concentric arrangement. As stated above, the cut patterns being ostensibly concentric allows for a rotational symmetry and its breaking (i.e., bending out of plane under an applied stress) that results in tilting behavior to occur in multiple axes, as will be discussed in more detail below. The arrangement and the number of cuts may establish the kirigami-based deformation of the underlying structure in which the cuts are made. In the examples shown in FIG. 1, the cuts are hexagonal in shape. Other shapes are possible. For example, the plurality of ostensibly concentric cuts may be circular, rectangular, square, or triangle shaped. For instance, a number of examples of different concentric cut patterns are described in WO 2020/102527, the entire disclosure of which is hereby incorporated by reference. For example, FIG. 24 of WO 2020/102527 shows schematic plan views of kirigami cut patterns of various shapes in accordance with a number of examples.

The plurality of ostensibly concentric cuts defines a set of structure sections. Each section, or portion between the concentric cuts, may be configured as or considered to act like a deformable beam. Each concentric cut, or ring, is a discontinuous cut, meaning each ring has one or more breaks (i.e., non-cut or uncut portions of the rings). These uncut portions of the rings act as hinges between adjacent concentric beams, or structure sections, and provide structural continuity between the outermost and innermost hexagonal rings. FIG. 1 illustrates cut patterns consisting of discontinuous concentric hexagonal cuts. Each hexagonal ring has two diametrically opposed splits (non-cut portions) rotated by 90° between each concentric set. In this regard, each concentric ring includes two cuts. In another example, each concentric ring may have additional uncut portions, which results in an additional number of cuts per ring. The hexagonal pattern may have an overall three-fold rotational symmetry about the central axis.

The outermost concentric cut, or ring, defines an outermost structure section. Likewise, the innermost concentric cut defines an innermost structure section. The innermost structure section includes an uncut portion of the underlying structure surrounding the common axis of the plurality of concentric cuts. In the expanded structure described below, the outermost and innermost structure sections become the "top"- and "bottom"-most horizontal members, or structure sections, respectively. These top- and bottom-most structure sections may also be referred to as outer structure sections, since both are located on opposite outer sides of the expanded structure (see FIG. 2).

There are several cut parameters that are used to dictate the cut pattern: the radial spacing (w), the cut phase angle (Φ), and the cut phase shift (γ), as well as the number of cuts along the perimeter. Radial spacing is the difference between the radii of adjacent concentric cuts. In other words, radial spacing indicates the distance between adjacent concentric cuts, as shown in FIG. 1b 102. Cut phase angle refers to the angle of the spacing of the uncut portions from the innermost concentric ring to the outermost concentric ring. As shown in FIG. 1a 100, the spacing of the uncut portions of the innermost ring is smaller than the spacing of the uncut portions of the outermost ring. This change of spacing results in the cut phase angle, as shown in FIG. 1c 104. Cut phase shift refers to an angular difference between locations of the uncut portions. As shown in FIG. 1a 100, the location of the uncut portions in the lower right segment of the hexagon is approximately in the middle of that segment. Changing the location of the uncut portions closer to where the lower right segment of the hexagon intersects with the bottom segment of the hexagon results in a phase shift of the cut, as shown in FIG. 1d 106.

As mentioned above, these cut parameters dictate the geometry of the beams and structure sections, as well as their deformations (i.e., relationship between displacement and tilt). As shown in FIG. 1, FIG. 1a 100 represents a base pattern, FIG. 1b 102 illustrates the radial spacing (w), FIG. 1c 104 illustrates the cut phase angle (Φ), and FIG. 1d 106 illustrates the cut phase shift (γ). In one example, the baseline pattern of FIG. 1a 100 may have a radial spacing of 0.75 millimeters (mm), a cut phase angle of 6°, and a cut phase shift of 0°. Other spacings, phase angles, and phase shifts are possible. In this example, FIG. 1b 102 differs from the baseline pattern of FIG. 1a 100 by decreasing the radial spacing to 0.5 mm. FIG. 1c 104 differs from the baseline pattern of FIG. 1a 100 by having a decreased cut phase angle of 3°. FIG. 1d 106 differs from the baseline pattern of FIG. 1a 100 by having a cut phase shift of 12°. These cut parameters may vary considerably. For instance, in other examples, the radial spacings may be unequal, the cut phase angle and the cut phase shift may increase, and/or the number of cuts may be a single, continuous cut.

As stated above, the cut patterns define kirigami beams based on the number of cuts along the perimeter. For example, FIGS. 20-23 of WO 2020/102527 show schematic plan views of various kirigami cut patterns having different number of cuts along the perimeter. The outer border in these examples are circular, but the sheet or underlying structure may be cut into any shape.

Figure 2:
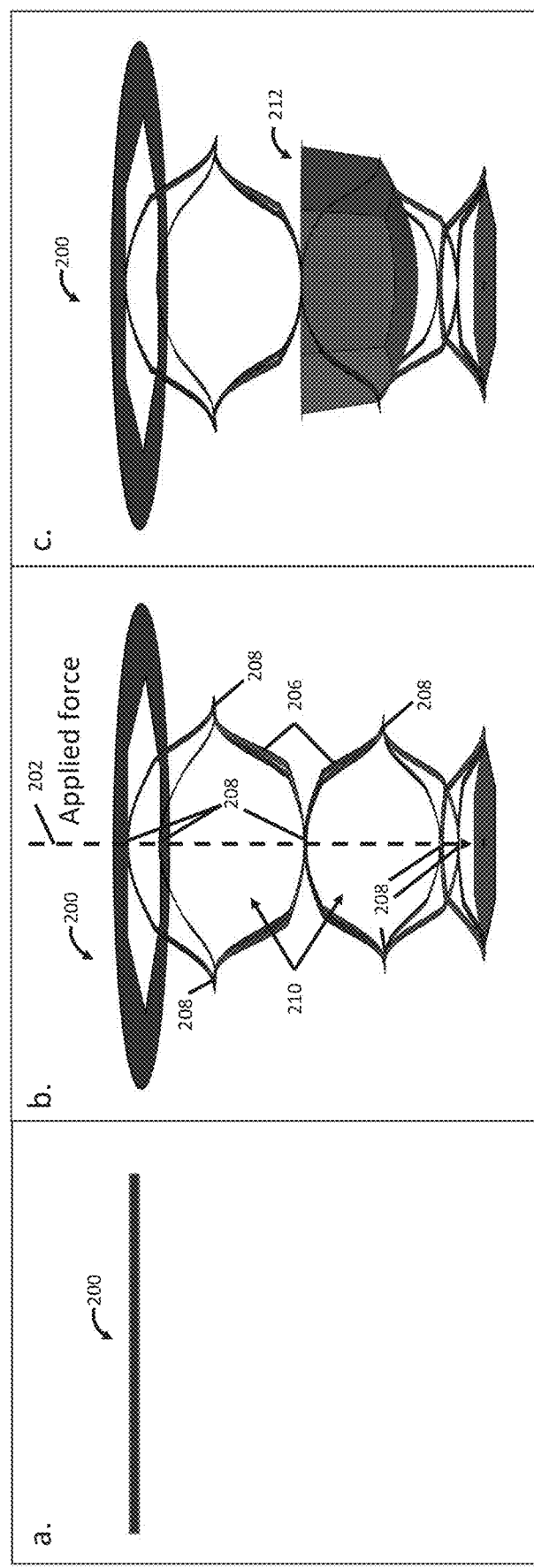
FIG. 2 illustrates a kirigami-based support structure before and after a force is applied to the structure in accordance with one example.

FIG. 2 illustrates the support structure 200 before and after a force 202 is applied to the structure 200. FIG. 2a shows the support structure 200 as a two-dimensional structure. Once the plurality of concentric cuts are made through the support structure 200, a force 202 is applied perpendicular to the original plane of the material in which the cuts are made, as shown in FIG. 2b. As a result, the support structure 200 substantially transforms (i.e., deforms) from the two-dimensional structure shown in FIG. 2a into a three-dimensional, one-piece spring-like structure, shown in FIG. 2b.

As mentioned above, the support structure 200 having the plurality of concentric cuts through the support structure 200 defines a set of structure sections. The plurality of cuts may be arranged such that the set of structure sections are disposed in a substantially concentric arrangement. The concentric arrangement and the number of cuts may establish the kirigami-based deformation of the structure sections. The deformation creates s-shaped beams 206, which are connected via saddle-points 208 formed by the uncut regions. As shown in FIG. 2, the outermost (i.e., top in FIG. 2) and innermost (i.e., bottom in FIG. 2) structure sections (collectively "outer structure sections") may be planar shaped and substantially parallel. The middle (i.e., inner or intermediate) structure sections may be substantially symmetrical and taper in size from larger to smaller between the outermost section and innermost section, respectively. The material of the support structure 200 may be a flexible material having elastic properties, such that when the applied force 202 is removed, the bottom portion may substantially "spring" back to its original configuration. In this regard, the support structure 200 may be configured as a compliant mechanism having a collapsible cone-like or bowl-like spring structure upon cross-plane deformation.

While FIG. 2 shows one example of a rotationally symmetric kirigami spring-like structure, other configurations and shapes are possible. For example, FIG. 26 of WO 2020/102527 depicts a number of examples of rotationally symmetric kirigami spring-like structures. In these examples, the radial spacing (w), the angular spacing (ϕ), the number of cuts along the perimeter of each concentric circle ($N_{pc}$), as well as the thickness and inner and outer diameters, are varied. The examples of FIG. 26 of WO 2020/102527 illustrate how different cut patterns influence the deformed state. The first six examples (Examples a-f) are kirigami springs, while the last example (Example g) is a normal conical helix spring. As discussed above, the resulting kirigami springs are configured by radial spacing (w), angular spacing (φ), the number of cuts along the perimeter of each concentric circle ($N_{pc}$), as well as the thickness (t) and inner and outer diameters ($D_i$ and $D_o$). Table 1 below shows the parameters (e.g., geometric parameters) associated with the cut patterns illustrated in FIG. 26 of WO 2020/102527. The difference between Example a and Examples b through d involves varying the parameters w, φ, and $N_{pc}$, respectively. The cut pattern in Example e differs from Example a in the parameters w, φ, and $N_{pc}$. Example f has nonequal radial spacings to demonstrate how different curvatures may be accommodated within the spring. For instance, strategically designing the radial spacing in accordance with the outer radius may result in a more cylindrical shape. Example g is a helical conical spring having one continuous cut, which does not exhibit local saddles. The extent to which each of the individual rings deflect within the kirigami structure is visually dissimilar especially with respect to the normal helical conical shape. The most notable difference between the kirigami springs and that of the helical spring is that, as the kirigami spring deflects, there is no torsional moment around the central axis.

TABLE 1

| | Radial Spacing (w) [mm] | Angular Spacing (φ) [°] | Number of Cuts ($N_{pc}$) |
|---|---|---|---|
| a | 3 | 10 | 2 |
| b | 5 | 10 | 2 |
| c | 3 | 25 | 2 |
| d | 3 | 10 | 4 |
| e | 1 | 5 | 4 |
| f | Varies | 10 | 2 |
| g | 2 | — | 1 |

Referring back to FIG. 2, the uncut structure sections disposed between the cuts act as hinges that cause the beams 206 to bend out of plane with an applied stress 202. As the support structure 200 is deformed, the beams 206 defined by the cuts bend out of plane, creating a collection of saddle points 208 with alternating positive and negative curvatures, enabling the support structure 200 to significantly deform. With such cross-plane deformation, the support structure 200 is capable of having structure sections with non-zero volumes 210 due to the deformation. These volumes 210 within the kirigami shaped of the support structure 200 may be used to accommodate a device or insert assembly 212, discussed in more detail below.

The device or insert assembly 212 may have a geometry that corresponds to a geometry of the plurality of cuts, which means the geometry of the insert assembly 212 also matches the geometry of an inner (i.e., middle) structure section. In this way, an inner structure section is configured to receive the device or insert assembly 212, as shown in FIG. 2c. Thus, the insert assembly 212 is supported by the support structure 200 at the middle structure section of the set of structure sections. The insert assembly 212 may be adhered to the beams 206 at the hinged portion of the support structure 202 (i.e., noncut portions of the rings). The insert assembly 212 may be adhered to face in either an upward or downward direction. When the support structure 200 is deformed into a three-dimensional structure, the set of structure sections deform into alternating saddle-like shapes. In the state shown in FIG. 2c, the plurality of concentric cuts, the set of structure sections, and the insert assembly 212 may have a common central axis.

Figure 3:
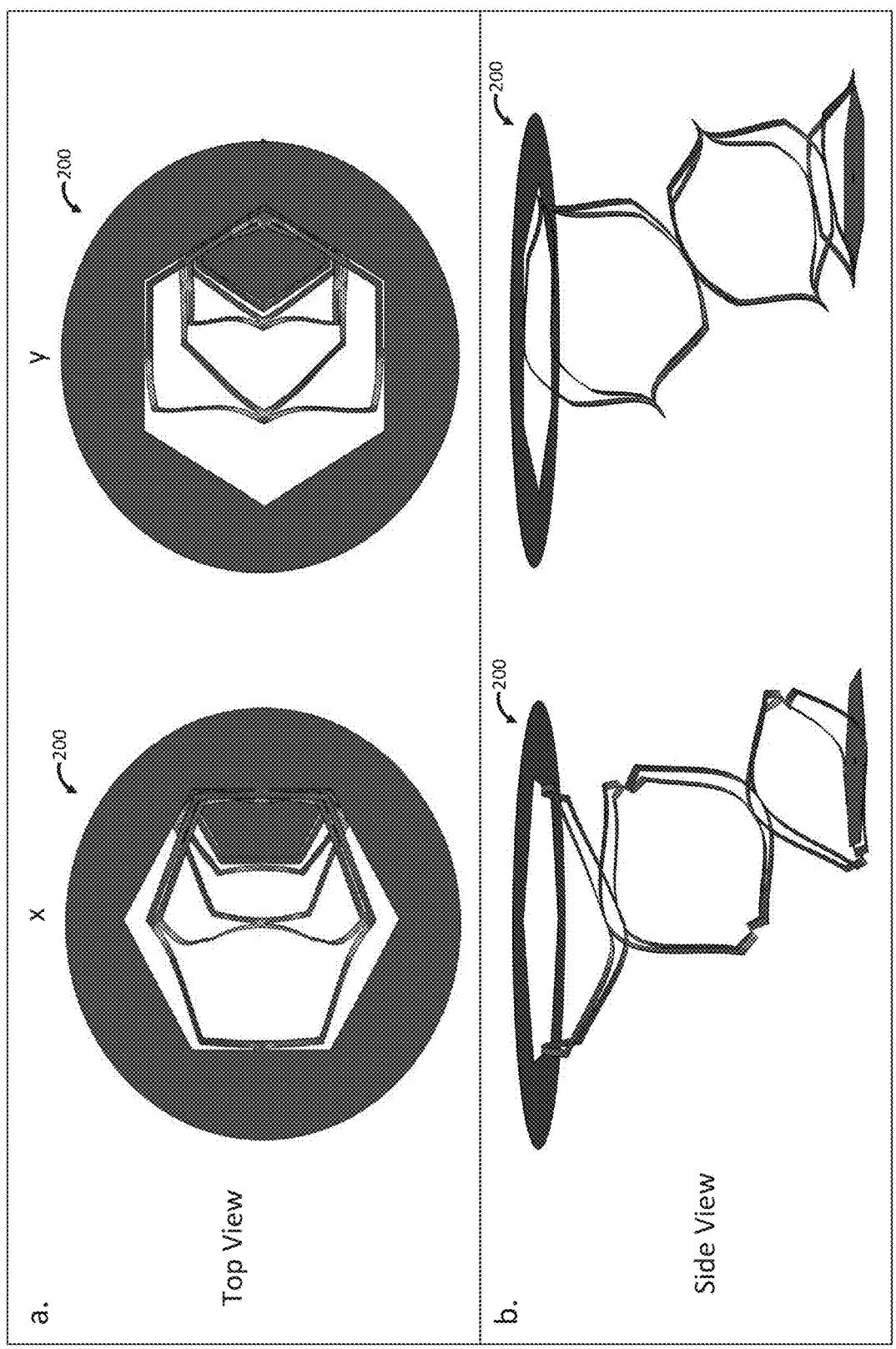
FIG. 3 illustrates top views and side views of a kirigami-based spring support structure after lateral displacement in two directions in accordance with one example.

FIG. 3 illustrates top views and side views of the disclosed kirigami spring support structure 200 after lateral displacement in two directions. In the example shown in FIG. 3, after the support structure 200 is deformed into the three-dimensional spring-like structure, the bottom hexagonal ring or innermost structure section (i.e., first outer structure section) may be laterally displaced in two directions (e.g., x-direction and y-direction) while the top ring or outermost structure section (i.e., second outer structure section) is kept stationary. The two directions are lateral directions and are along a plane of the first outer structure section. In the example of FIG. 3, the first and second outer structure sections are planar shaped and parallel to each other. In another example, the first and second outer structure sections may not be parallel. Displacement of the innermost structure section results in a tilting of the middle rings, or structure sections. Thus, the inner (i.e., middle) structure section is configured to tilt the insert assembly 212 (not shown in FIG. 3) at a tilt angle in accordance with a displacement of the first outer structure section of the set of structure sections. In other words, the first outer structure section is configured to be displaced in one or more lateral directions, where the inner structure section is configured to be deformed based on a displacement of the first outer structure section, and where the insert assembly 212 is configured to tilt along one or more axes based on a deformation of the inner structure section.

In the example shown in FIG. 3, FIG. 3a depicts the top view and FIG. 3b depicts the side view of the deformed support structure 200 when the innermost hexagon is displaced 25 mm, for example, in the x-direction and y-direction, from left to right. In another embodiment, the top hexagonal ring may be displaced while the bottom hexagonal ring is stationary. The displacements may be in the x-direction, the y-direction, or both. In this regard, the first or second outer structure section is a fixed outer structure section and the other outer structure section of the first or second outer structure section is configured to be displaced in one or more lateral directions relative to the fixed outer structure section. The ability of the support structure 200 to withstand lateral displacements in multiple directions allows the middle structure section(s) to tilt along more than one axis. This increased range of motion allows increased tracking capabilities and is advantageous over single-axis tracking systems.

When sliding the top structure section and bottom structure section parallel to each other, as depicted in FIG. 3, the symmetry of the structure sections is broken, causing the connecting beams 206 to tilt simultaneously. Previously aligned saddle-points 208 located on the same cut perimeter in the middle ring are no longer aligned horizontally. Rather, they are aligned at a tilt angle, represented as θ. The greater the displacement, the greater the tilt angle.

A maximum tilt angle achievable for a given displacement is based on several factors. The direction of the applied force 202, such as pulling, dictates the pivot points of the support structure 200, as seen in FIG. 3a. As will be discussed below, the direction in which the insert assembly 212 is facing may have an additional influence on the maximum tilt angle. To control and better optimize the support structure 200 to achieve greater tilt angles, the cut pattern can be changed according to the parameters discussed above with respect to FIG. 1.

Figure 4:
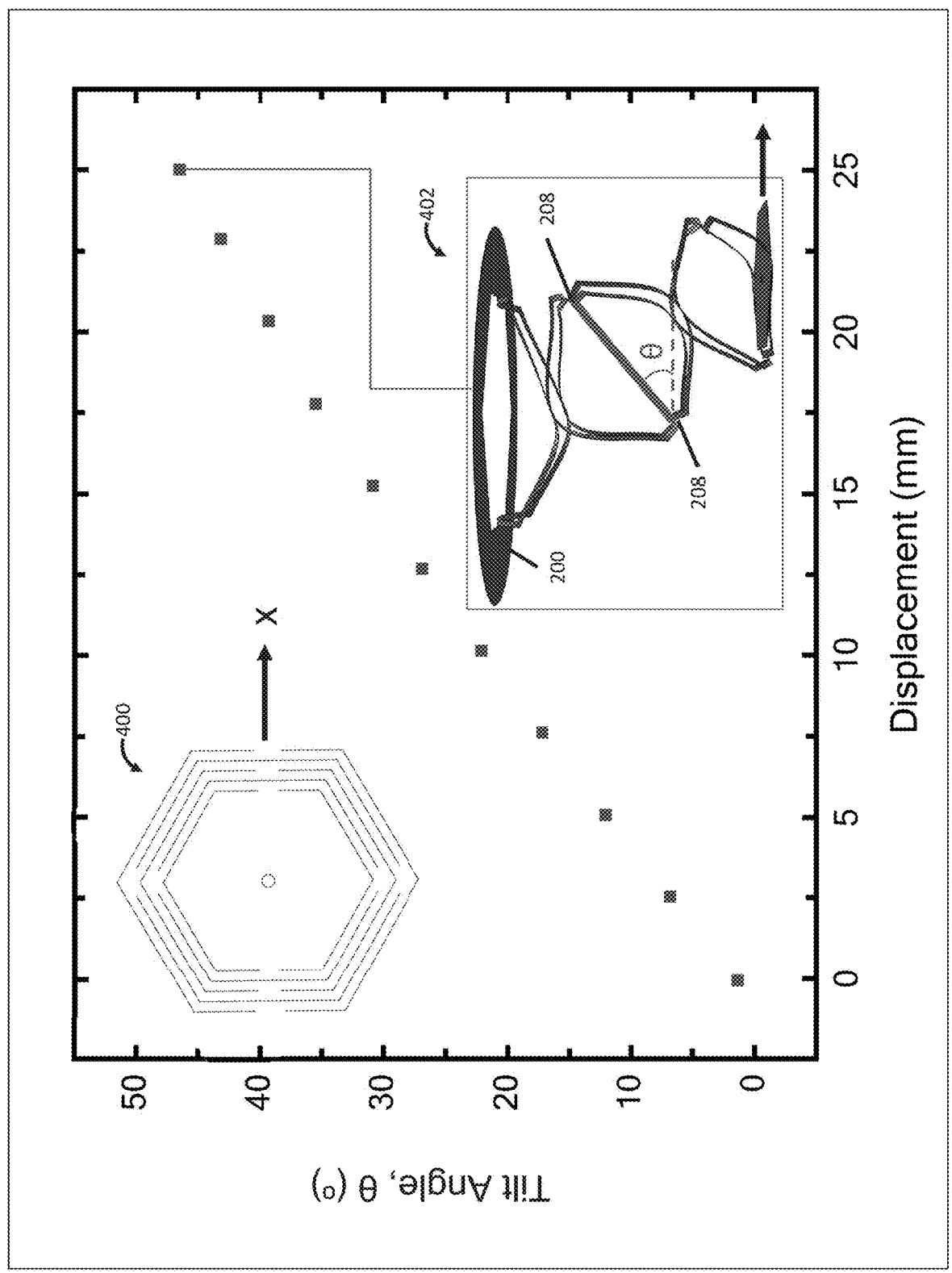
FIG. 4 illustrates the relationship between lateral displacement and tilting angle of a kirigami-based spring support structure in accordance with one example.
Figure 22:
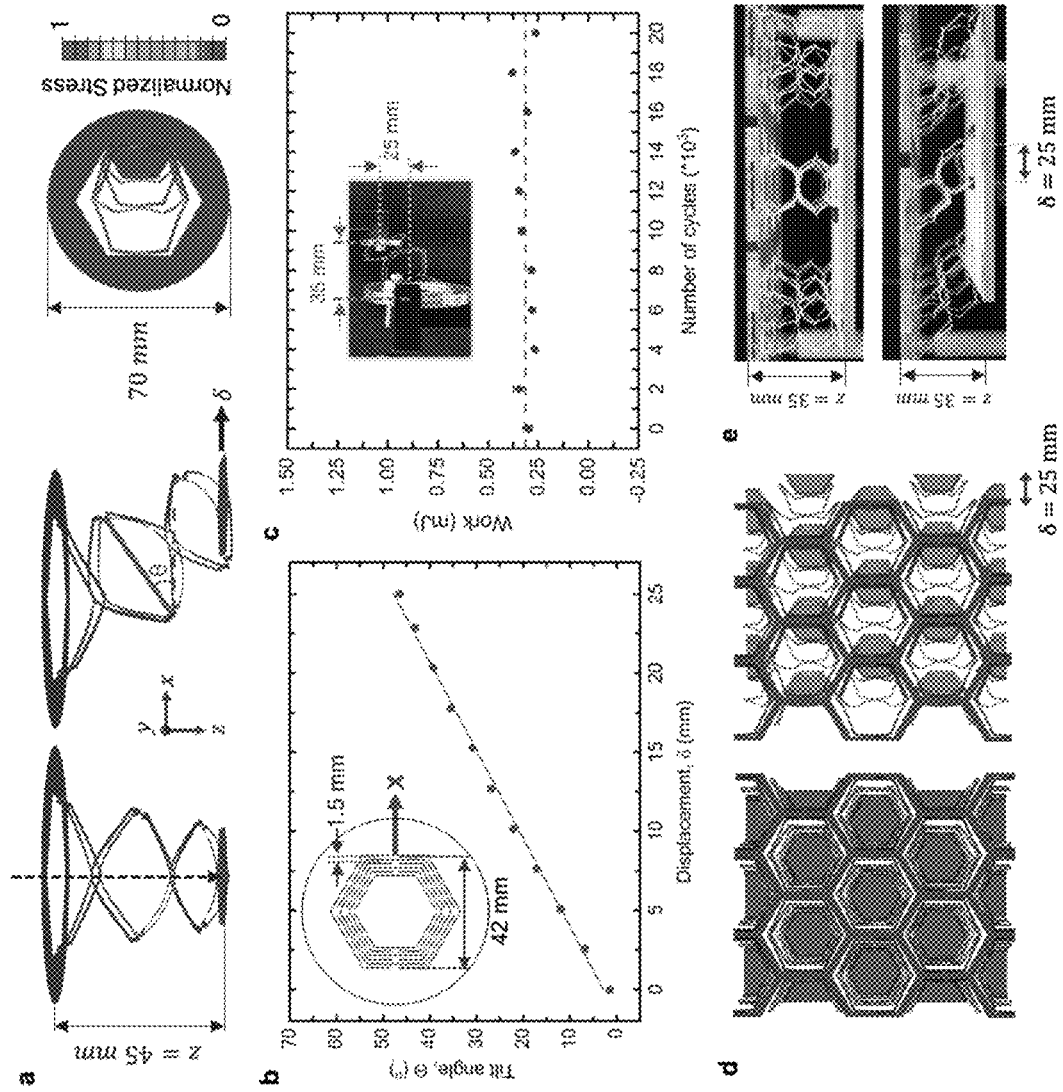
FIG. 22 illustrates testing results of a hexagonal kirigami spring tilting mechanism in accordance with one example.

FIG. 4 illustrates the substantially linear relationship between the lateral displacement, δ, of the system in the x-direction represented in FIG. 2b and the tilting angle of the middle structure section, or ring, represented as θ. The relationship between the angle θ and the lateral displacement δ is controlled by the geometry of the cuts and cross-plane displacement, z. The top left inset 400 of FIG. 4 shows an example cut pattern and the bottom right inset 402 shows a Finite Element Model (FEM) of the deformed spring-like support structure 200 at a displacement of 25 mm, for example. Other displacements are possible. As shown in FIG. 22 below, the FEM clearly shows that stress is concentrated in the cut ends. This indicates that the placement of other elements, such as an insert assembly 212, within the support structure 200 with minimal risk of structural damage should be placed at these minimal stress locations. As shown in FIG. 4, when the displacement δ is 25 mm, the tilt angle θ is about 47 degrees, given a height (z) of 35 mm. While the displacement and height in this example are 25 mm and 35 mm, respectively, other displacements and heights may be used. As the lateral displacement increases, one side of the beams 206 are pulled downwards and the other side of the beams 206, which are closer to the direction of the applied force 202, bend upward causing the middle plane to rotate. A red line connecting the two saddle points 208 that results in tilt angle, θ, is shown for clarity in FIG. 4.

Figure 5:
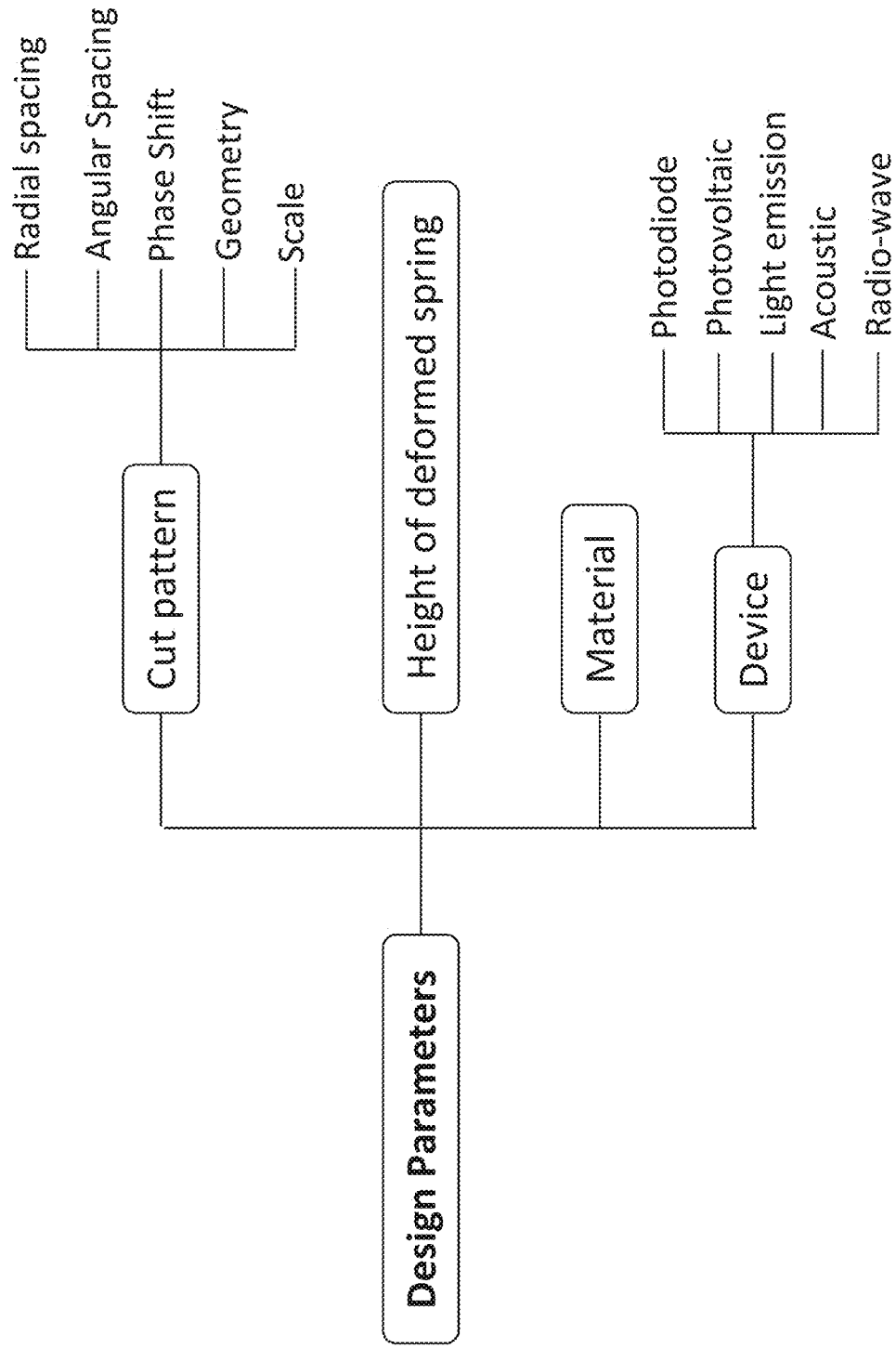
FIG. 5 is a diagram depicting design parameters of a kirigami-based spring support structure in accordance with several examples.

FIG. 5 represents a breakdown of how some of the design parameters dictate the system behavior and applications. For instance, as discussed above, the radial spacing, angular spacing, phase shift, geometry, and scale are variables that make up the cut pattern. The height of the deformed spring-like support structure 200 and the inherent material properties effect the tilt angle and system fatigue life, as will be discussed below. There are numerous devices or inserts that are substitutable into the middle plane represented by the red line in the inset of FIG. 4. Generally speaking, the devices are electrical devices, capturing devices, optical devices, transducer devices, wave processor devices, or any other active devices (i.e., a device that requires a source of energy for its operation and has an output). This includes, but not limited to, a photodiode, a photovoltaic cell, and light emitting, acoustic, and radio-wave transmitter and receiver devices. Other devices, such as sensors or lenses, are enabled as well. For instance, in one example, a lens positioned within the middle structure section enables the lens to focus light to an area on a base of the structure in which a solar cell is located. In another example, pressure sensors positioned within the middle structure section enable tracking of pressure from a pressure source. The various devices mentioned above are configurable to detect, track, measure, focus, or otherwise capture various signals or energies, including, but not limited to, electric signals, air waves, radio waves, sound waves, electromagnetic waves (such as light), pressure, and temperature, as well as motion or proximity.

Figure 6:
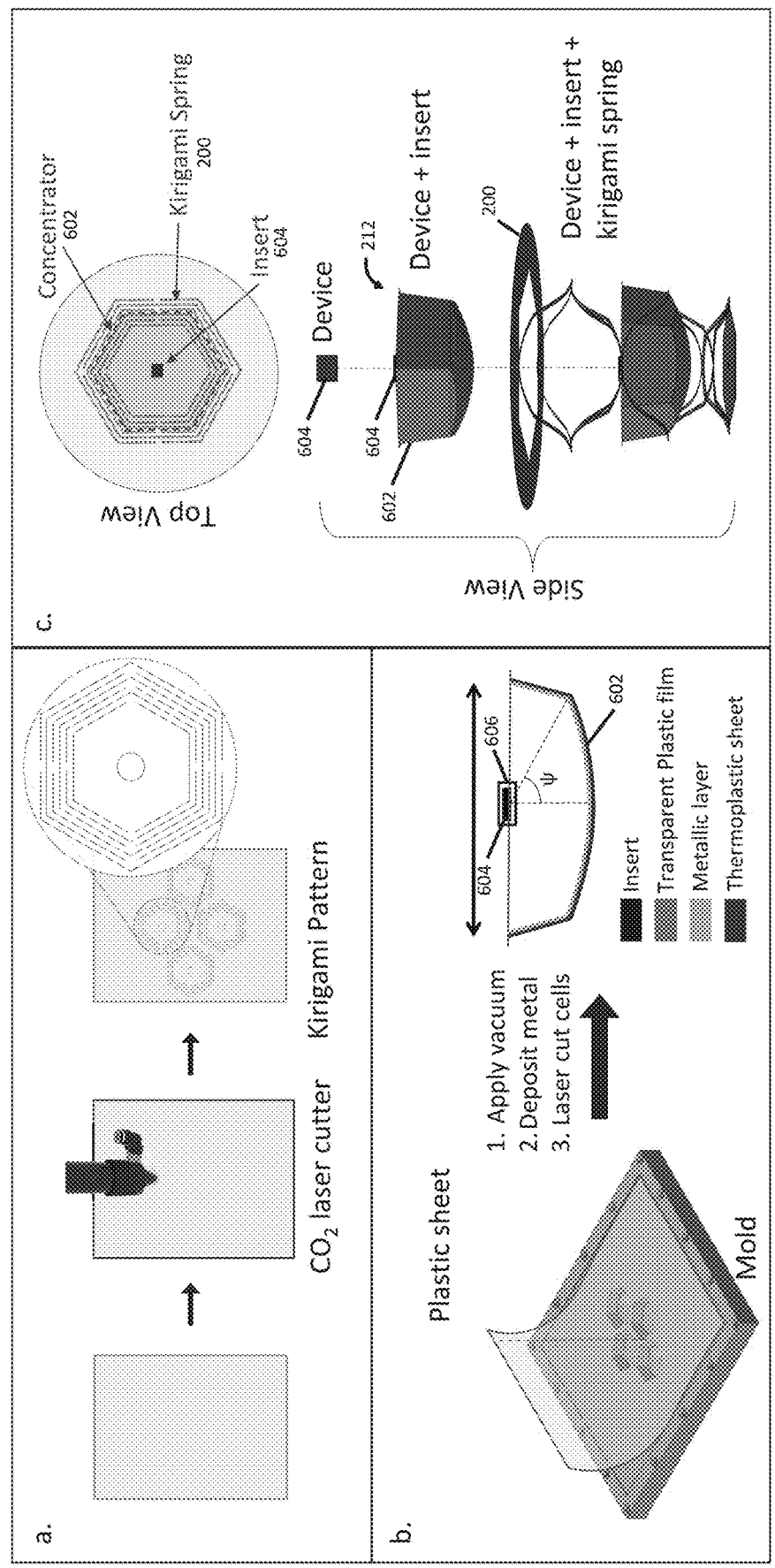
FIG. 6 illustrates the fabrication and assembly process of a kirigami-based spring support structure in accordance with one example.

FIG. 6 illustrates the fabrication and assembly process of the disclosed tracking system based on the kirigami cutting design principles of FIG. 1. While one embodiment is shown in FIG. 6 and described below, the manner in which the disclosed devices are fabricated and assembled may vary. In one embodiment, such as solar energy harvesting, for example, the kirigami support structure 200 is made by first cutting a sheet according to a cut pattern, as shown in FIG. 6a. The sheet or substrate may be machined or otherwise processed to form the cuts in a variety of ways. For example, laser- or etching-based processes have been used to cut the sheet. It is understood that other methods of generating cuts can also be used, such as with a sharp blade, water jet, or a metal die. The materials used to fabricate the kirigami spring may be composed of, or otherwise include, a variety of materials including, for example, thin plastic sheets, thin metal films, laminates, as well as smart materials, such as shape memory polymers or shape memory alloys. In one example, polyethylene terephthalate (PET) sheets is used. In this example, a thin plastic, UV-resistant, sheet is laser cut into the desired kirigami pattern discussed above, forming the kirigami base spring or support structure 200, as shown in FIG. 6a. In this example, the spacing between cuts is 1.5 mm and two cuts along the perimeter are made for each concentric ring. The support structure 200 material, thickness, shape, size, and other parameters may be selected to reduce or minimize the weight of the support structure 200 and otherwise render the support structure 200 more suitable for incorporation into tracking systems, such as multi-axis optical tracking systems.

The plurality of concentric cuts on the material may be made in array, such as a lattice structure, across a portion of the material so that each cut pattern, or unit cell, is adjacent to another unit cell of a plurality of cuts. This is shown in the far-right side of FIG. 6a. The lattice layout of the cut patterns may or may not be symmetrical. In the example shown in FIG. 6a, the array of cut patterns is diamond shaped. In another example, the array of cut patterns may be square shaped. Other array shapes are possible.

To maintain the deformed state of the spring-like support structure 200 without having to sustain an applied force 202, the shape can be molded, where a heat treatment may be applied at a temperature above the glass transition temperature of the thermoplastic for a short duration (i.e., minutes). The support structure 200 may then behave like a compressive spring. Maintaining the deformed state allows the support structure 200 to provide support to adjacent structures that may attach to or otherwise be coupled to or in contact with the support structure 200. For example, in a solar energy harvesting application, maintaining a deformed state may allow the support structure 200 to provide support for panels or panes of plastic or glass attached to, or in contact with, the support structure 200 (see FIG. 14).

In one embodiment, the insert assembly 212 includes an optical concentrator 602. The optical concentrator 602 may be a parabolic concentrator, such as a parabolic dish concentrator. The concentrator 602 may be a reflective device configured to concentrate emissions from a source to a focal point. The concentrator 602 form may be made by vacuum thermoforming, as shown in FIG. 6b. A metal negative mold with the precise geometry to form the concentrators 602 is perforated to allow for the vacuum thermoforming process. In this example, the geometry of the parabolic optical concentrator 602 corresponds to the geometry of the kirigami cut pattern. The thermoformed sheet may then be coated with metal to make the concentrator 602 reflective, then laser cut and adhered to a transparent sheet or cover.

More specifically, a thin, stiff plastic sheet (e.g., 0.5 mm thick polyethylene terephthalate glycol (PETG) sheet) is aligned and secured to the metal negative mold with Kapton tape. The mold/sheet is then heated in an oven to 100° C., which is above the 88° C. glass transition temperature of PETG. In another example, a 250 micrometer (μm) PETG sheet is heated at 105° C. for 10 minutes. Other sheet thicknesses and heating temperatures may be used. Other materials may be used as well. In one example, materials that are UV-resistant, such as Lexan™, a polycarbonate material, could be used for resistance to UV-degradation. In another example, plastics having higher transparency and glass transition temperatures may be used, since those plastics may benefit dimensional stability in operation, where higher temperatures may be encountered. A vacuum is then pulled to suction the PETG into the mold and held for one minute. The sample is removed from the oven and cooled. Other processes, such as sheet stamping, could also be used to make the concentrator 602. A shadow mask is then placed on the sample and a silver layer is deposited in the wells of the parabolas via vacuum thermal evaporation (VTE). The silver layer may have a thickness of 0.5 μm, but other thicknesses may be used. The sheet is then laser cut, yielding individual hexagonal unit cells. A top sheet of polyethylene terephthalate (PET) is laser cut and adhered to match the geometry of the top of the concentrator 602 with a hole for the inserted device 604 (e.g., active device). The PET layer may have a thickness of 0.1 mm, but other thicknesses may be used. The hole in the PET sheet on top of the concentrator 602 is located at the focal point of the parabolic mirror. In one embodiment, the active device 604 placed on the transparent cover of the concentrator is a solar cell (i.e., photodiode/photovoltaic cell) that is placed facing toward the reflective concentrator 602 at the hole (i.e., focal point). The solar cell is configured to capture the concentrated emissions from the concentrator 602. As discussed above, optical devices or transducer devices may be used as the inserted device 604. Wave or energy processing devices may also be used as the inserted device 604, and may process electromagnetic waves, such as light or radio waves, or mechanical waves, like sound waves.

A shadow mask may be used to deposit electrodes on the top PET sheet, which is used to connect the solar cell to the support structure 200. The electrical connections are configured to collect the photogenerated electricity. The cut pattern may establish a wiring path for the components supported by the support structure 200. As described below, the wiring path may electrically connect a microcontroller with various components in addition to the active device of the insert assembly 212, including, for instance, actuators, gyroscopes, instrument amplifiers, an electrical impulse generator, and a power source (e.g., a battery).

The support structure 200 may support a variety of different structures in addition to the insert assembly 212. For example, the support structure 200 may include an electronics unit. The electronics unit may be disposed along one of the structure sections (e.g., at a position that experiences a minimal or lower amount of deformation). The electronics unit may include one or more electronic components. The positioning of the electrodes in a region of lower or minimal deformation may be useful for reducing, minimizing or preventing resistance changes outside of the active device, which would otherwise detrimentally affect the deformation or other measurements. Alternatively or additionally, the electronics unit and its one or more components may be configured such that deformation of the support structure 200 does not affect (e.g., significantly affect) the resistance. In other examples, the electronics unit may be or include a microcontroller, which may be disposed in a central or other portion of the support structure 200 that provides sufficient space while experiencing minimal deformation.

FIG. 6b shows an image of the negative mold with the plastic sheet, as well as the design of the concentrator 602. A rim angle of 60° was chosen due to surface reflections at high incident angles. The parabolic concentrator 602 can be replaced by other shapes of mirrors, Fresnel optics, troughs, etc., depending on the design of the support structure 200 and the intended application. The kirigami solar tracking system includes the photodiode/photovoltaic cell 604, the highly reflective parabolic dish concentrator 602, and the kirigami spring 200. The photodiode/photovoltaic cell 604 and the parabolic dish concentrator 602 together may be referred to as an insert assembly 212. The insert assembly 212 is then inserted and affixed to the kirigami support structure 200.

FIG. 6c shows a top and side view of the kirigami solar tracking system, which also highlights where the concentrator 602 sits with respect to the kirigami pattern. Referring back to FIG. 4, the red segment connecting the two saddle points 208 on a given perimeter of the cuts indicates the location where a concentrator device 602, such as the hexagonal parabolic mirror described above, is inserted into the support structure 200. The concentrator 602 is precisely aligned in the center of the pattern and opposite ends of the concentrator 602 along its edge are adhered to the spring. The concentrator 602 may be bonded or otherwise secured to the spring support structure 200. In some cases, the concentrator 602 is bonded to the support structure 200 with an adhesive, such as epoxy resin. Alternatively or additionally, the concentrator 602 is formed on the support structure 200 and thereby affixed thereto using a strong adhesive or bonded by epoxy. In the example shown in FIG. 6c, the insert assembly 212 is positioned within a middle structural section with the side of the insert assembly 212 on which the active device 604 (e.g., optical device, transducer device, or wave processor device) sits facing up (i.e., toward outermost, or top-most, structural section). In another example, discussed below, the insert assembly 212 may be positioned in a reverse manner, in which the thin plastic film layer of the concentrator 602, including the attached solar cell 604, faces downward (i.e., toward the innermost, or bottom-most, structural section). As mentioned above, the insert assembly 212 is configured to tilt to perform optical tracking. For example, sliding the bottom portion (i.e., base, innermost or bottom-most structural section) of the kirigami unit cell in a manner described above and depicted in FIG. 3 will produce a tilt of the concentrator-spring assembly.

Figure 7A:
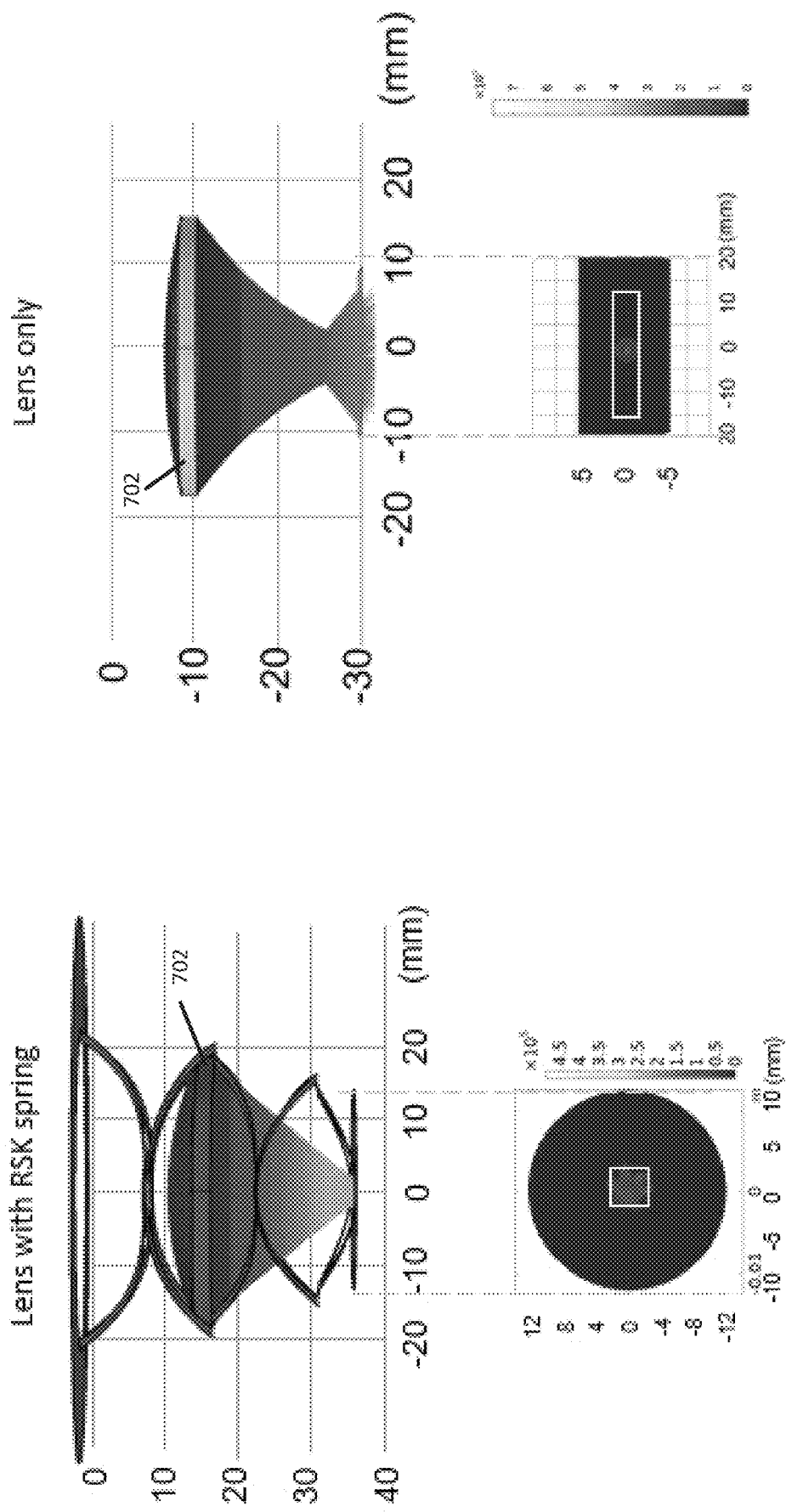
FIGS. 7A and 7B illustrate a kirigami-based spring support structure in accordance with one example where the insert is a lens.
Figure 7B:
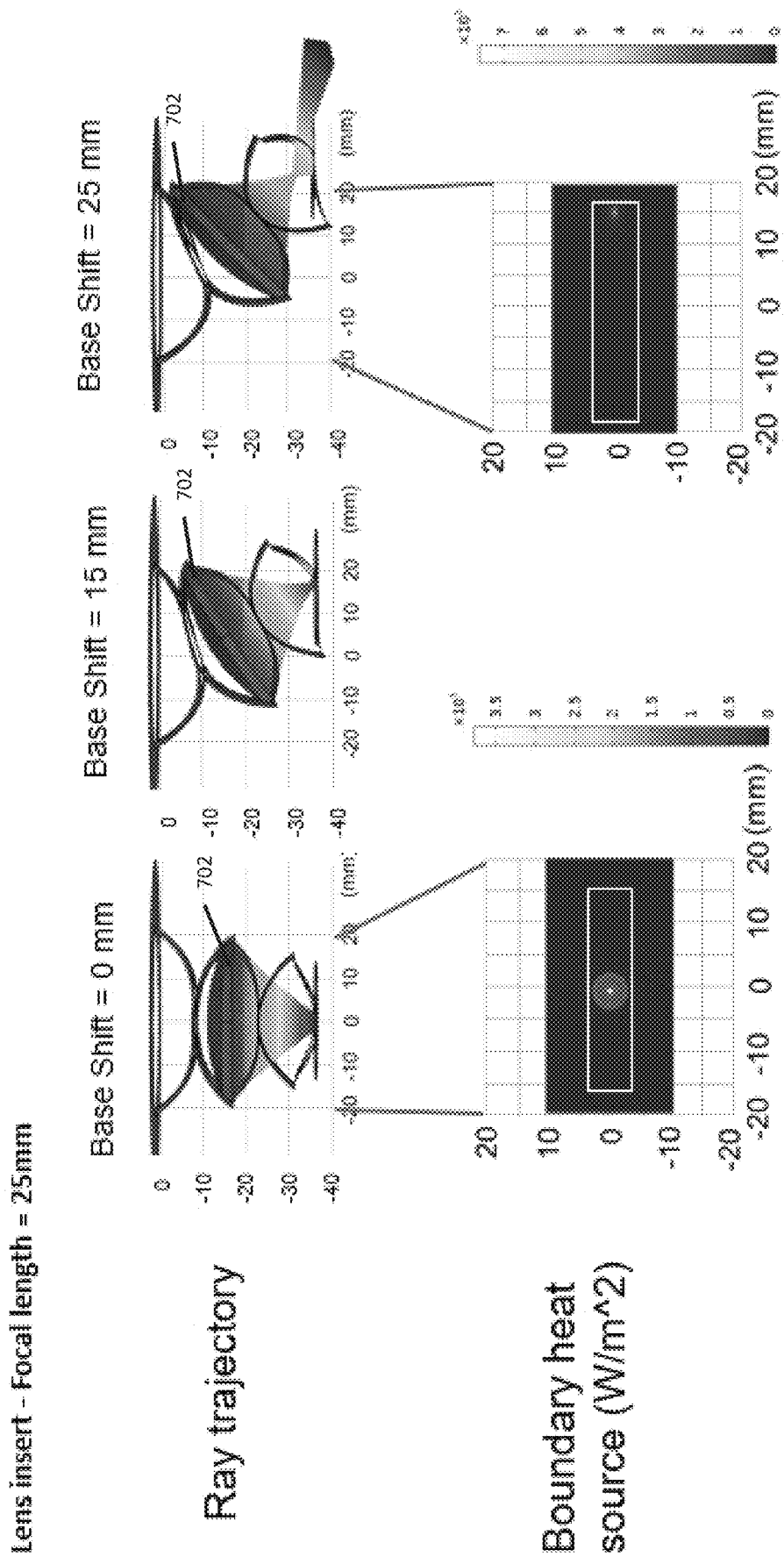

In another embodiment, the insert assembly 212 includes a lens 702, as shown in FIGS. 7A and 7B. The lens 702 may be a conventional lens, an aspheric lens, a Fresnel lens, and the like. The lens 702 enables emissions from a source, such as light from the sun, to be focused to a focal point, focal spot, or focal area. Referring back to FIG. 4, the red segment connecting the two saddle points 208 on a given perimeter of the cuts indicates the location where a lens 702 is inserted into the support structure 200. The lens 702 is precisely aligned in the center of the pattern and opposite ends of the lens 702 along its edge are adhered to the spring 200. The lens 702 may be bonded or otherwise secured to the spring support structure 200. In some cases, the lens 702 is bonded to the support structure 200 with an adhesive, such as epoxy resin. Alternatively or additionally, the lens 702 is formed on the support structure 200 and thereby affixed thereto using a strong adhesive or bonded by epoxy.

As mentioned above, the insert assembly 212 is configured to tilt to perform optical tracking. For example, sliding the bottom portion (i.e., base, innermost or bottom-most structural section) of the kirigami unit cell relative to the top portion in a manner described above and depicted in FIG. 3 will produce a tilt of the lens 702 assembly. As the lens 702 tilts, the focal point may sweep out a small area, or focal area. In other words, the focal point changes as the lens 702 tilts and the resulting area covered by this back and forth "sweeping" motion is the focal area. The focal point, and thus the focal area, is adjustable further via the height of the kirigami spring-like support structure 200. As the bottom-most and upper-most structural sections slide parallel to one another, the focal area may be adjusted or fine-tuned by adjusting or shifting the vertical distance between the bottom-most and upper-most structural sections. The focal area may be positioned on the base of the kirigami spring-like support structure 200. Mounting a device 604, such as a solar cell 604, on the bottom portion to encompass the focal area swept by the focal point allows for substantial concentration of solar emissions captured by the solar cell 604. This configuration also enables easier heat-sinking of the solar cell 604 (i.e., improved heat dissipation at higher optical concentration values), which leads to operation at lower temperatures and higher efficiency.

Figure 8:
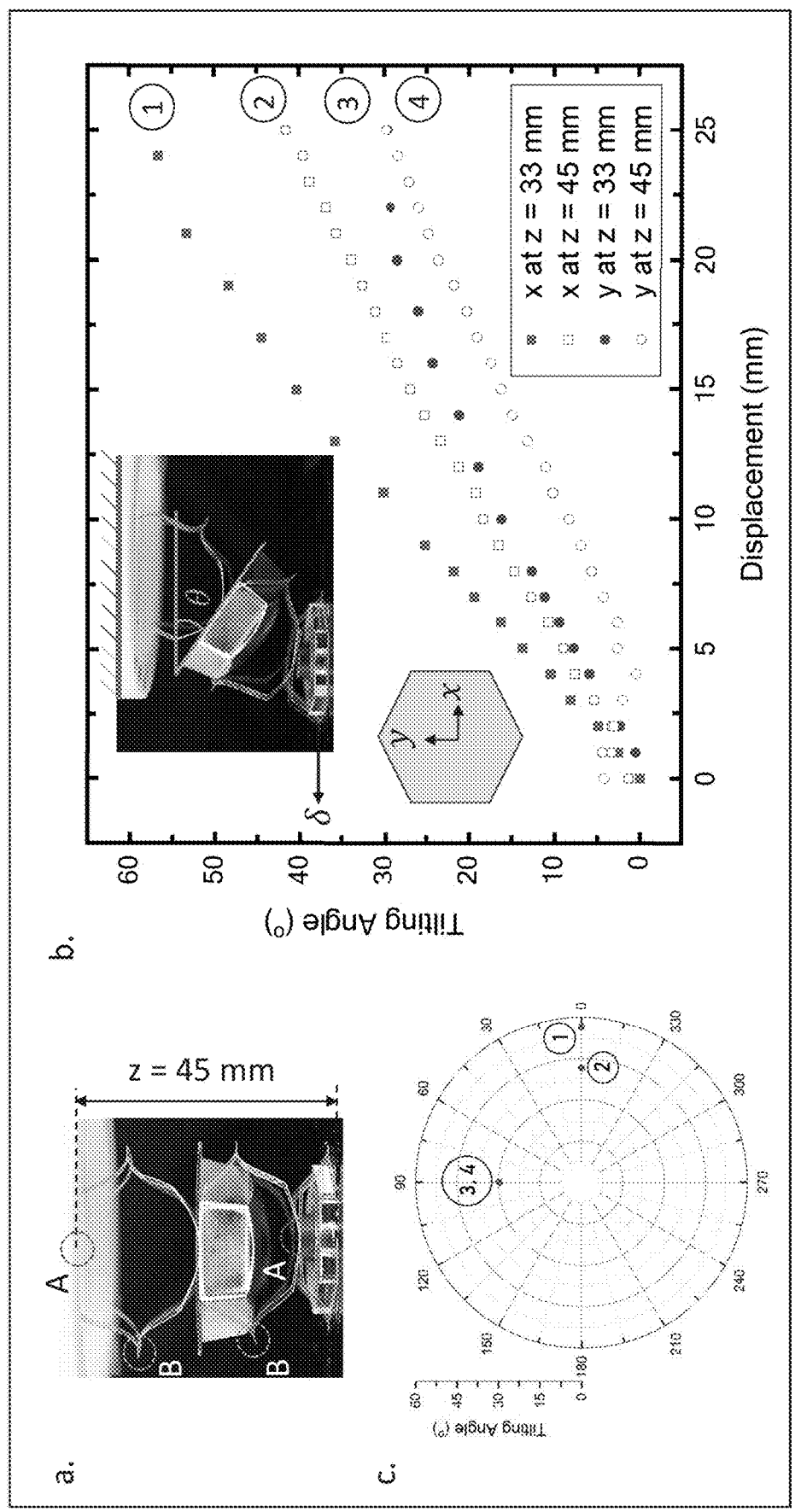
FIG. 8 is a graphical plot of data for experimentally measured tilt angles versus lateral displacements of a kirigami-based spring support structure in accordance with several examples.

FIG. 8 depicts graphical plots of experimentally measured tilt angles θ versus lateral displacements δ of the disclosed concentrator-spring assembly. As described above with respect to FIG. 4, the tilting angle θ of the concentrator 602 embedded in the kirigami spring 200 is determined by a specified amount of displacement δ applied to the bottom, innermost hexagon. Tilt angle θ as a function of displacement δ was measured experimentally showing a monotonic, approximately linear dependence, as shown in Equation (1):

$$\theta = 1.8\delta + 2.9. \tag{1}$$

This dependence is applicable for the cut pattern shown in the inset of FIG. 4 in which there are two cuts per "ring", z=45 mm, the spacing between cuts is 1.5 mm, and the angular spacing is 6°. (The non-zero tilt at zero displacement is a measurement artifact due to sub-optimal camera angle during data collection.) The influence of varying cut parameters and directionality of displacement δ are discussed above with respect to FIG. 1.

The neutral position of the kirigami solar tracking system is represented in FIG. 8a, where z represents the height of the spring 200. The cut pattern in this example is the same pattern that is represented in the inset of FIG. 4 and the top view of FIG. 6c. In FIG. 8a, (A) represents the pivot points when pulling in the x-direction, and (B) represents the pivot points when pulling in the y-direction. In the example of FIG. 8b, the height of the spring 200 is set at 33 mm and 45 mm and the innermost hexagon experiences an applied strain or deflection δ in the x and y direction while the outermost hexagonal ring is fixed in place. This was done to determine the effects of changing the height z and directions of displacement δ. At each specified displacement δ, an image of the system was taken using a camera, and the tilt angle of the concentrator 602 was determined using the computer program ImageJ. The numbers next to each curve are represented on the polar plot in degrees in FIG. 8c. The radii in the graphical plot of FIG. 8c represent the maximum tilting angle of the system in degrees. As shown in FIG. 8, a displacement of δ=25 mm in the x-direction results in a larger maximum tilt angle compared to the same displacement in the y-direction. Furthermore, increasing the height of the spring 200 decreases the maximum tilt angle $\theta_{max}$ as expected for an equivalent hinged mechanism.

Figure 9:
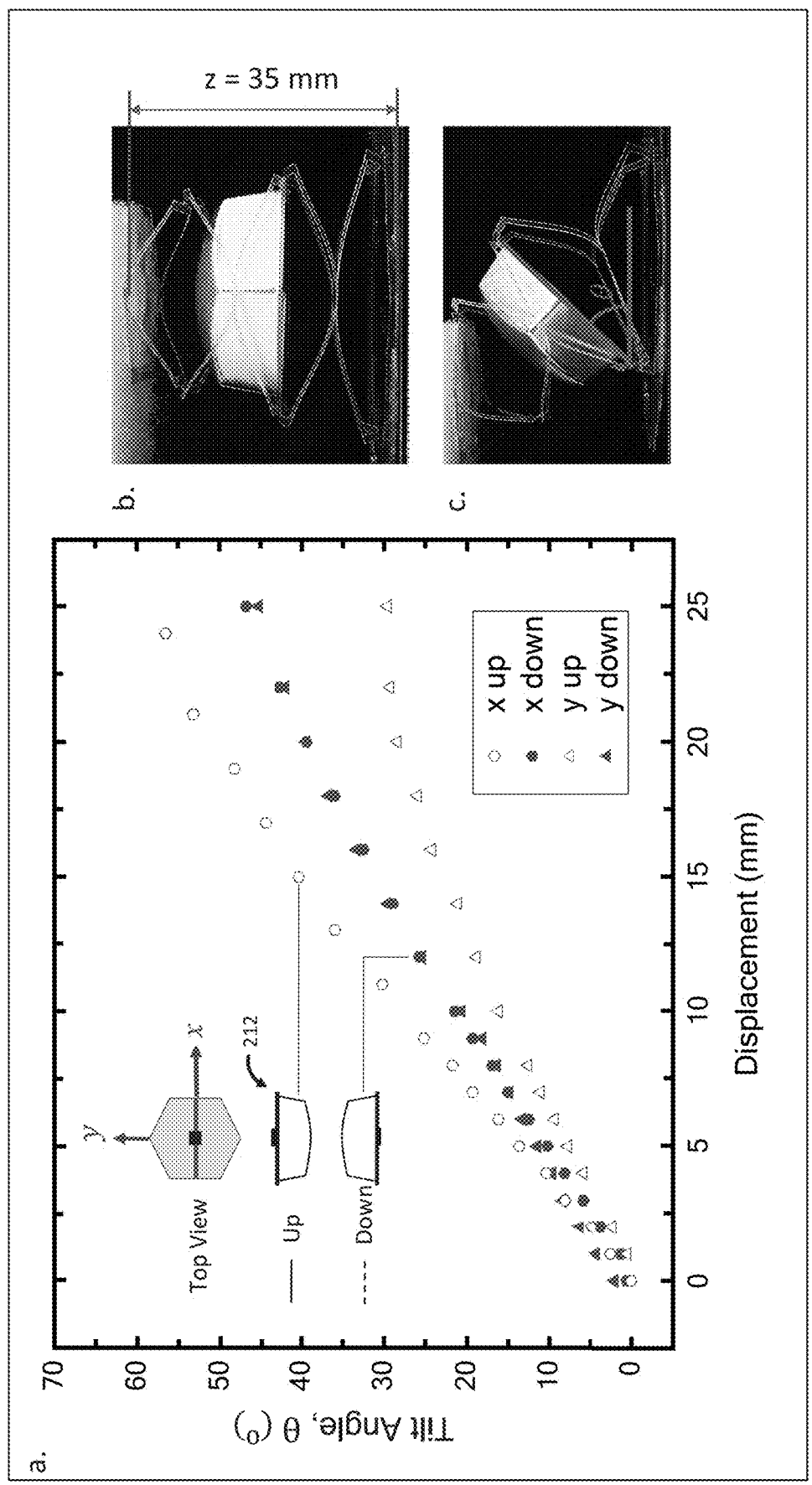
FIG. 9 is a graphical plot of data for experimentally measured tilt angles versus lateral displacements of a kirigami-based spring support structure facing up versus facing down in accordance with several examples.

FIG. 9 depicts graphical plots of experimentally measured tilt angles θ versus lateral displacements δ of the disclosed concentrator-spring assembly facing up versus facing down. In some embodiments, the weight of the insert assembly 212 can stretch the kirigami shape appreciably, depending on the "up" or "down" orientation, as shown in FIG. 9, which impacts the angle of tilt versus displacement behavior, as shown in FIG. 9. The tilt angle as a function of displacement varies based on whether the concentrator 602 insert assembly 212 is facing up or down. The solid points in FIG. 9a indicate the concentrator 602 facing down and the open points represent the concentrator 602 facing up. The circle symbol represents pulling in the x-direction and the triangular symbol represents pulling in the y-direction. The height of the system for each of these experiments is 35 mm as shown in FIG. 9b, and a tilt angle of 40° is shown in FIG. 9c. When the system is facing up, the concentrator 602 is located closer to the innermost hexagonal ring, as compared to the concentrator 602 facing down, which is due to the force of gravity. For the concentrator 602 facing up, longer beams 206 are used to hold the concentrator 602 in place. Longer beams 206 are more flexible than shorter beams 206, as determined based on the cantilever beam theory. Therefore, less force is required to deflect the beams 206. Thus, the effect of gravity pulling down on the concentrator 602 is more evident in the system facing upward scenario. As shown by FIG. 9, there is a larger discrepancy in the achievable maximum tilt angle between pulling in the x-direction versus the y-direction when the concentrator 602 is facing up.

Figure 10:
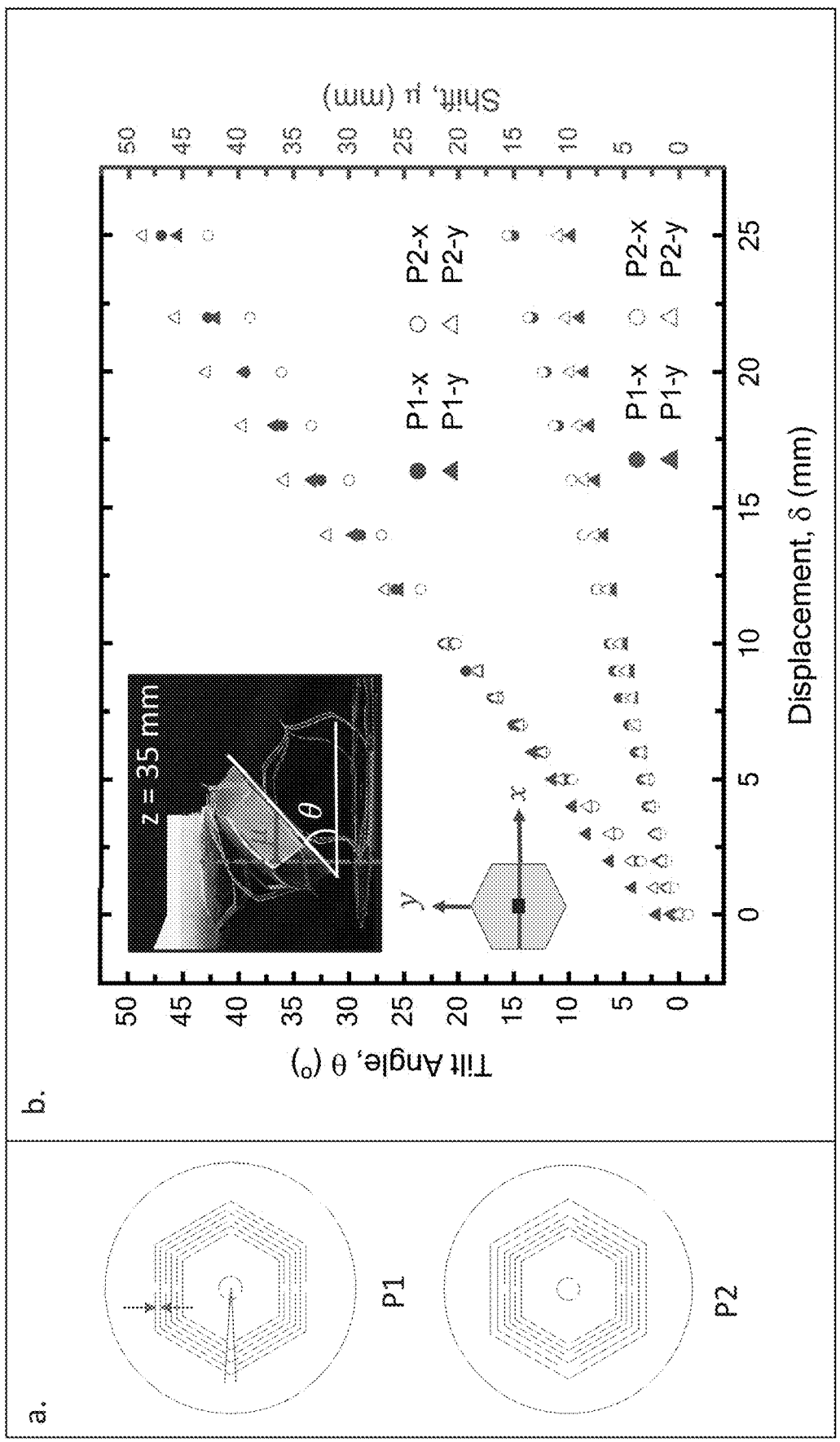
FIG. 10 is a graphical plot of data showing the linear relationship between an amount of translation of an insert assembly and the displacement of an innermost structure section of a kirigami-based spring support structure in accordance with several examples.

FIG. 10 depicts graphical plots of the linear relationship between an amount of translation of the insert assembly 212 and the displacement of the innermost structure section. The maximum tilt angle $\theta_{max}$ varies depending on the cut pattern when the concentrator 602 is facing down. As the tilt angle increases, upon increasing applied displacement, the concentrator 602 shifts from the median. This translation occurs in the direction of the pull (i.e., displacement) and is signified as μp, as shown in the inset of FIG. 10b. This measurement is useful in some applications, such as solar tracking for energy harvesting, where the concentrators 602 must be placed far enough apart that the concentrators 602 do not appreciably hinder each other, mechanically and/or optically. The translation when pulling in the y-direction can be minimized by increasing the phase angle. Shortening the length of the beam 206 to a certain extent induces a greater tilt angle. However, this comes at the expense of the maximum tilt angle pulled in the x-direction, so herein lies another trade-off considered when designing the kirigami spring pattern.

The inset of the spring structure 200 of FIG. 10b shows the concentrator 602 facing down with a shift μ=15 mm and tilt angle θ=47° in the y-direction at a height of 35 mm. There is a linear relationship between the amount of translation and the displacement of the innermost hexagon. The circular symbols represent displacement in the x-direction, and the triangles indicate displacement in the y-direction. Altering the cut pattern changes the maximum tilting angle achievable at 25 mm displacement. Inset P1 of FIG. 10a refers to the baseline cut pattern, in which the spacing between the cuts is equal. Inset P2 refers to another cut pattern, in which the radial and angular spacing of the outermost rings are increased by 50% and 60%, respectively. In P2, pulling in the y-direction, δ, surpasses the maximum tilt angle achieved by straining in the x-direction, δ, as well as P1 in both directions. The concentrator 602 does not shift to the same degree as straining it in the x-direction. There is an accompanying shift, μ, of the concentrator 602 in the δ direction, which increases with δ. FIG. 10b shows that μ is linearly proportional to δ of the innermost hexagon. Increasing beam 206 width and shortening the length of the beam 206 (i.e. increasing the stiffness), increases $\theta_{max}$ in the y-direction. Through optimization of the cut pattern, sheet thickness, and composition, these phenomena can be controlled and minimized, and greater tilt angles may be achievable.

The design of the insert assembly 212 in the solar energy harvesting application is engineered to strike a balance between increasing the concentration factor to reduce the usage of an expensive high efficiency solar cell, and decreasing the concentration factor to avoid excessive heating of the solar cell that would adversely impact its performance. On the other hand, if the device 604 is used to generate heat as an objective, it may be desirable to further increase the concentration factor. In one example, using a photodiode to measure the optical performance of the tracking concentrator 602, an approximately 80× optical concentration and over 50× electrical concentration may easily be achieved with the parabolic insert approximately 50 mm in width.

Figure 11A:
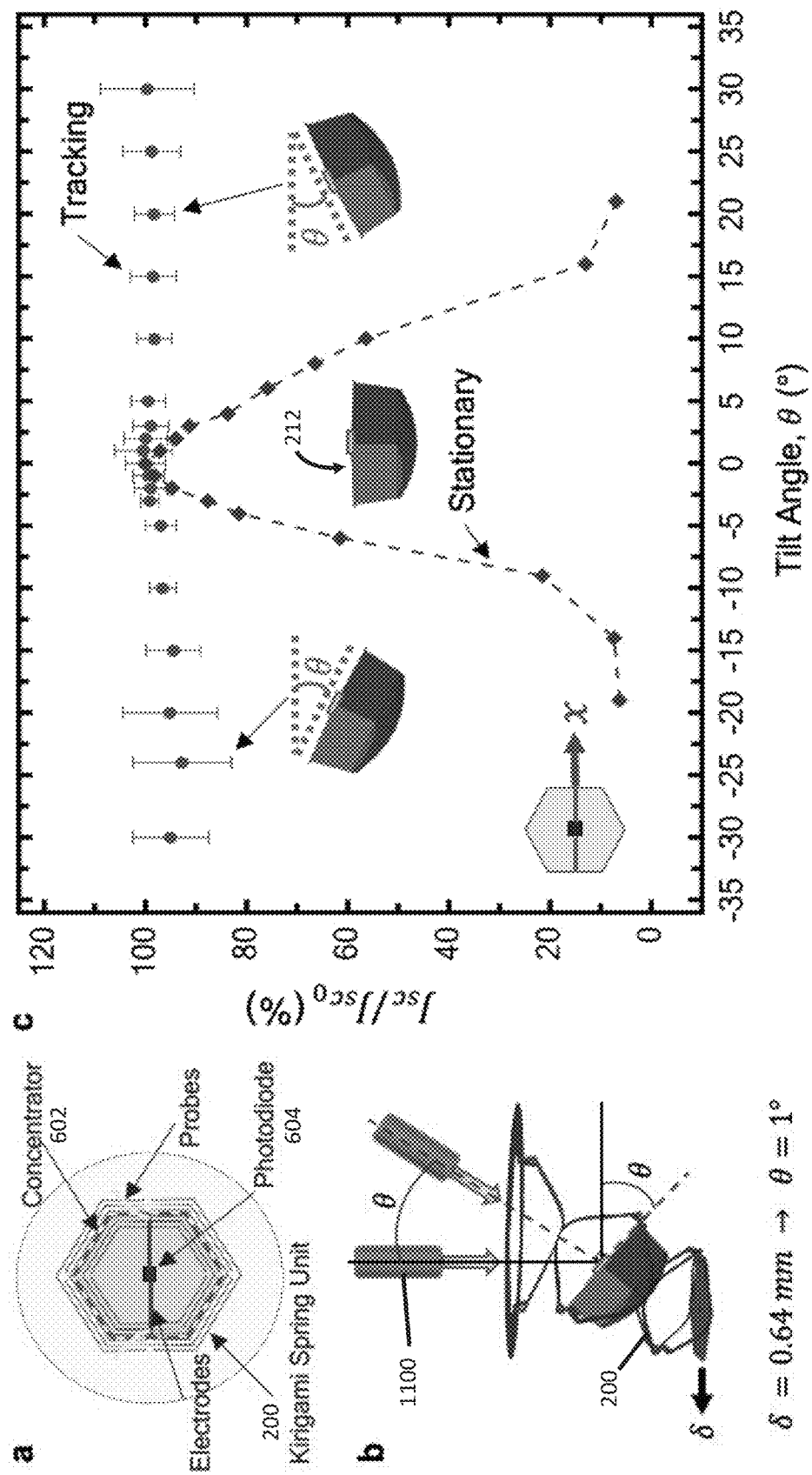
FIGS. 11A and 11B illustrate the tracking performance of an individual kirigami-based spring tracker assembly in accordance with several examples in which Part c of FIG. 11A depicts translation in the x-direction and FIG. 11B depicts translation in the y-direction.
Figure 11B:
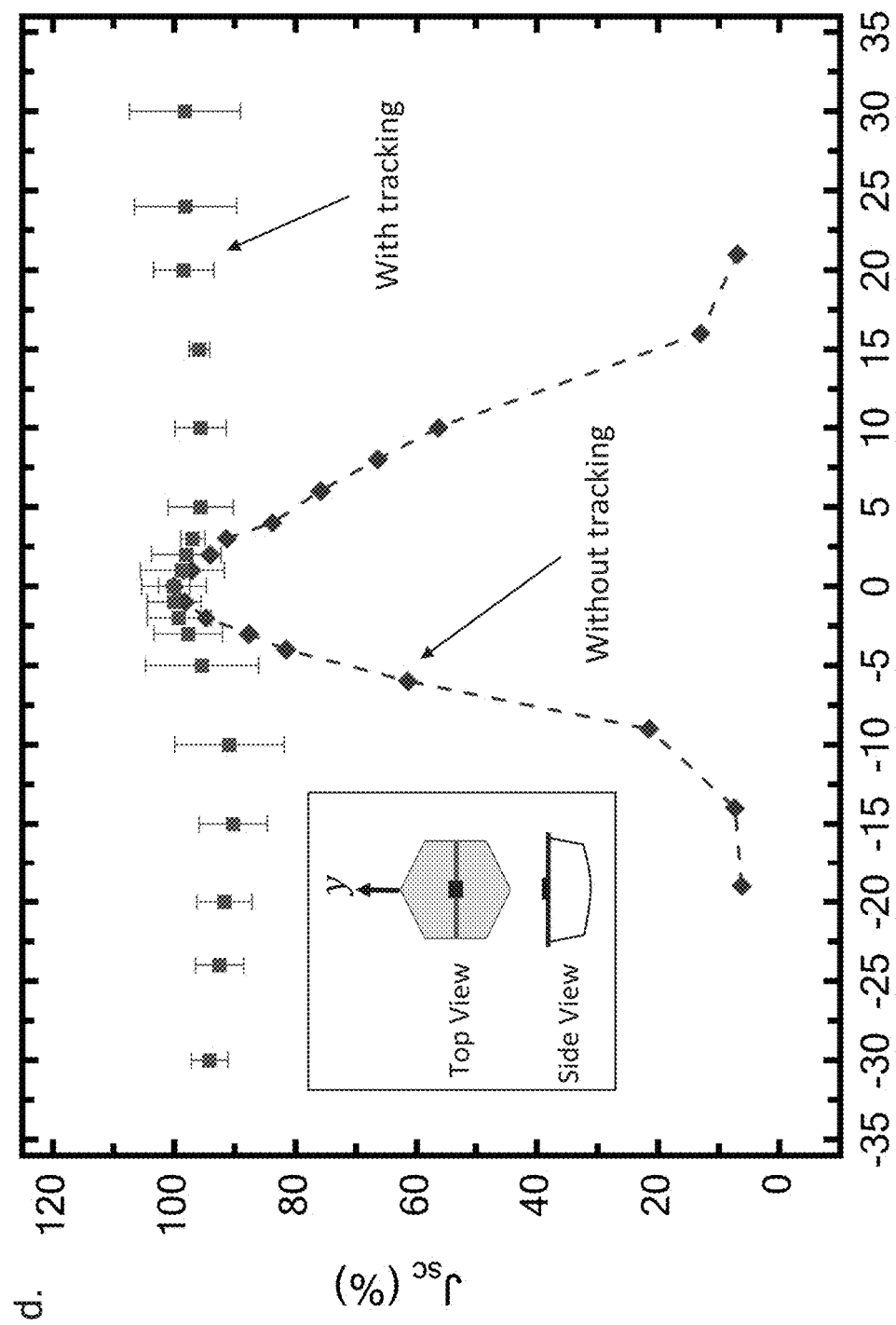

FIGS. 11A and 11B illustrate the tracking performance of an individual kirigami spring tracker assembly. In the examples shown in FIGS. 11A and 11B, the disclosed kirigami spring 200 is integrated with a mini concentrator 602 and photodiode 604. FIGS. 11A and 11B illustrate how the individual kirigami spring concentrator assembly tracks a moving light source 1100 using a photodiode 604 in the focal spot of the concentrator 602. The top view of the system is depicted in Part a of FIG. 11A, which shows the cut pattern of the kirigami spring 200, the placement of the concentrator 602 with respect to the spring 200, the centered photodiode 604 or photovoltaic cell 604, as well as the electrode locations and placement of probes for measuring the electrical current. The side view of the testing setup of the tracker is shown in Part b of FIG. 11A. In this example, a concentrator 602 with a geometric concentration factor, CF, of 182 is used. CF is defined as $A_{conc}/A_{cell}$, where $A_{conc}$ is the aperture area of the concentrator 602 and $A_{cell}$ is the area of the photodiode/photovoltaic cell 604. The light source 1100 rotates at a specified angle, θ, in one-degree increments, which matches the tilt angle of the concentrator 602. The tilting angle corresponds to the displacement of the bottom, innermost hexagon, while the top portion of the spring 200 remains fixed. In one example, the light source 1100 may face upward. In this case, the tracker may be flipped upside down, allowing the concentrator 602 to face the light source 1100. At a height of 35 mm and for the baseline pattern, a displacement, δ, of 0.64 mm correlates to a tilt angle of one degree.

In Part c of FIG. 11A, the percentage of the short circuit current, $J_{sc}$, is plotted against the tilt angle θ. The circular symbols with error bars correspond to the system when tracking in the x-direction while the diamond symbols represent the system without tracking. Part c of FIG. 11A demonstrates how $J_{sc}$ remains virtually unchanged when varying the tracking angles in contrast to the stationary system. In one example, a Newport solar simulator (e.g., model #91191-1000) may be used and calibrated to AM1.5 (1000 W/m2) using an NREL Si reference cell (e.g., Model PVM233 KG5). The outermost hexagonal ring may be mounted to a 3D printed holder with a cut out to allow light to penetrate. A Thorlabs motor controlled translational stage (e.g., PTI-Z8) may be mounted to the top part of the 3D printed holder. The innermost hexagon may be mounted to the stage. The 3D printed holder may then be mounted to a rotational stage placed over the solar simulator. The rotational stage mimics the changes in the elevation and azimuth angle of the sun, depending on the placement of the spring 200. The rotational stage tilts to the same degree as that of the spring 200 so the concentrator 602 remains perpendicular to the light source 1100. Thin, flexible copper wires connect the photodiode 604 (e.g., OSRAM Opto Semiconductors, Inc., model BPW 34 S-Z) to the measurement unit. The J-V characteristics may be measured using a semiconductor parameter analyzer. Deviations may be attributed mainly to human error of aligning the individual spring 200 to the stage, slight misalignment of the concentrator 602 in the spring 200, and imperfect reflectivity of the concentrator 602. However, these issues may easily be mitigated by automation during array production. A misalignment of 4° between the light source 1100 angle and photodiode 604 drops the performance by 20%, more rapidly than the cosine loss, as expected for this type of concentrator 602.

FIG. 11B illustrates analogous measurements for translation in the y-direction. In FIG. 11B, the tracker pulled in the y-direction remains around 100% of the $J_{sc}$. Similar to above, the deviations can be attributed to human error of aligning the spring 200 to the stage, as well as aligning the concentrator 602 in the spring 200 and the imperfect reflectivity of the concentrator 602 made under laboratory conditions. Deviations may also be due to the error in manually tilting the rotational stage that holds the 3D printed holder and system, and shadowing effects from the rotational stage and opaque 3D printed holder. Reflector quality may be improved with higher quality of the mold used to form it, vapor polishing, and other methods known to those having ordinary skill in the art.

Figure 12:
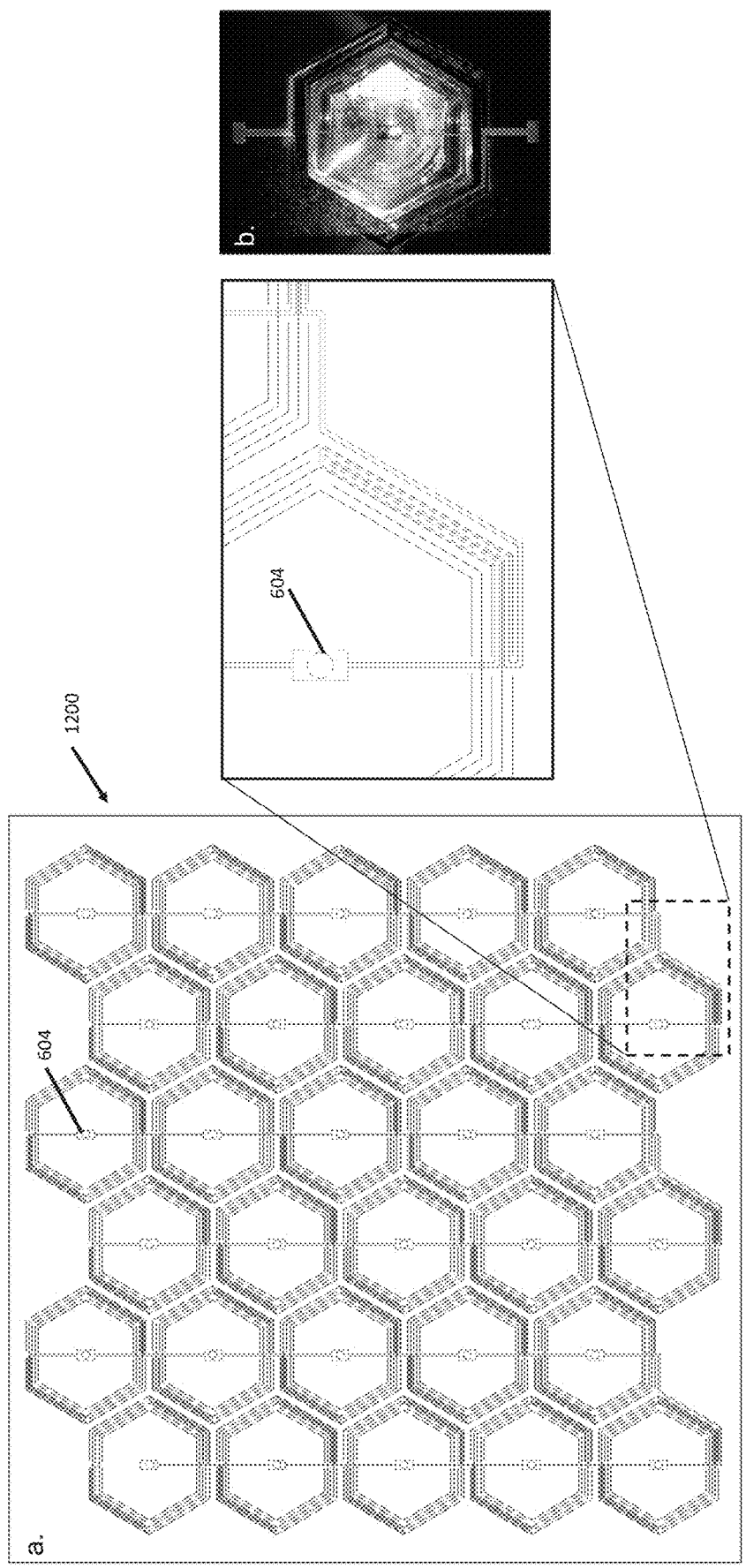
FIG. 12 illustrates a kirigami-based solar tracking array in accordance with one example.

FIG. 12 illustrates an example of a kirigami-based solar tracking array 1200. In this example, one sheet carries the entire array 1200; it may also carry a segment of the array 1200. In the example shown in FIG. 12, for application to photovoltaic panels, the plurality of solar trackers, or tracking modules, of kirigami shape (with insert assemblies 212) are arranged in a honeycomb-like array 1200. Other array geometries are possible. For example, the plurality of tracking modules may be arranged in a rectilinear array, or grid pattern. Even though a laser cutter may cut each of the unit cells (i.e., groups of kirigami support structures 200 having kirigami cut patterns), the unit cells remain intact to be simultaneously displaced. Displacement of the bottom plate array first in the z-direction and using actuators (e.g., motors connected to the bottom plate to move it in the x and y directions relative to the top late) causes the individual inserts to tilt, as described above for the individual shapes (see FIG. 22 below for additional views of a deformed array). In one example, a sun path trajectory algorithm and Global Positioning System (GPS) information are used for precise automated positioning of the dual-axis solar tracking system array 1200. The solar tracking system array 1200 may be calibrated based on the initial orientation of the system, as well as the slope of a roof on which it is placed.

The red circles in FIG. 12 indicate the placement of the active device 604, or photovoltaic cell 604. The blue lines represent the kirigami cut pattern. The green lines represent the electrode trail which connects the unit cells and the active devices 604. In one example, the fabrication of the electrodes may consist of depositing a 7 nanometer (nm) thick iridium (IR) adhesion layer, followed by a 700 nm thick gold (Au) layer. In another example, thicker layers, thermoelectric material layers, or high emissivity layers may be used on the electrodes to increase heat dissipation from the solar cell 604. The solar cell 604 may attach to the electrodes using silver conductive paste, wire bonding or other electrically conductive adhesive methods. The closeup shows more clearly the kirigami pattern and electrodes that are routed through the pattern (i.e., between adjacent cuts of the plurality of concentric cuts) and connect adjacent unit cells.

Figure 13:
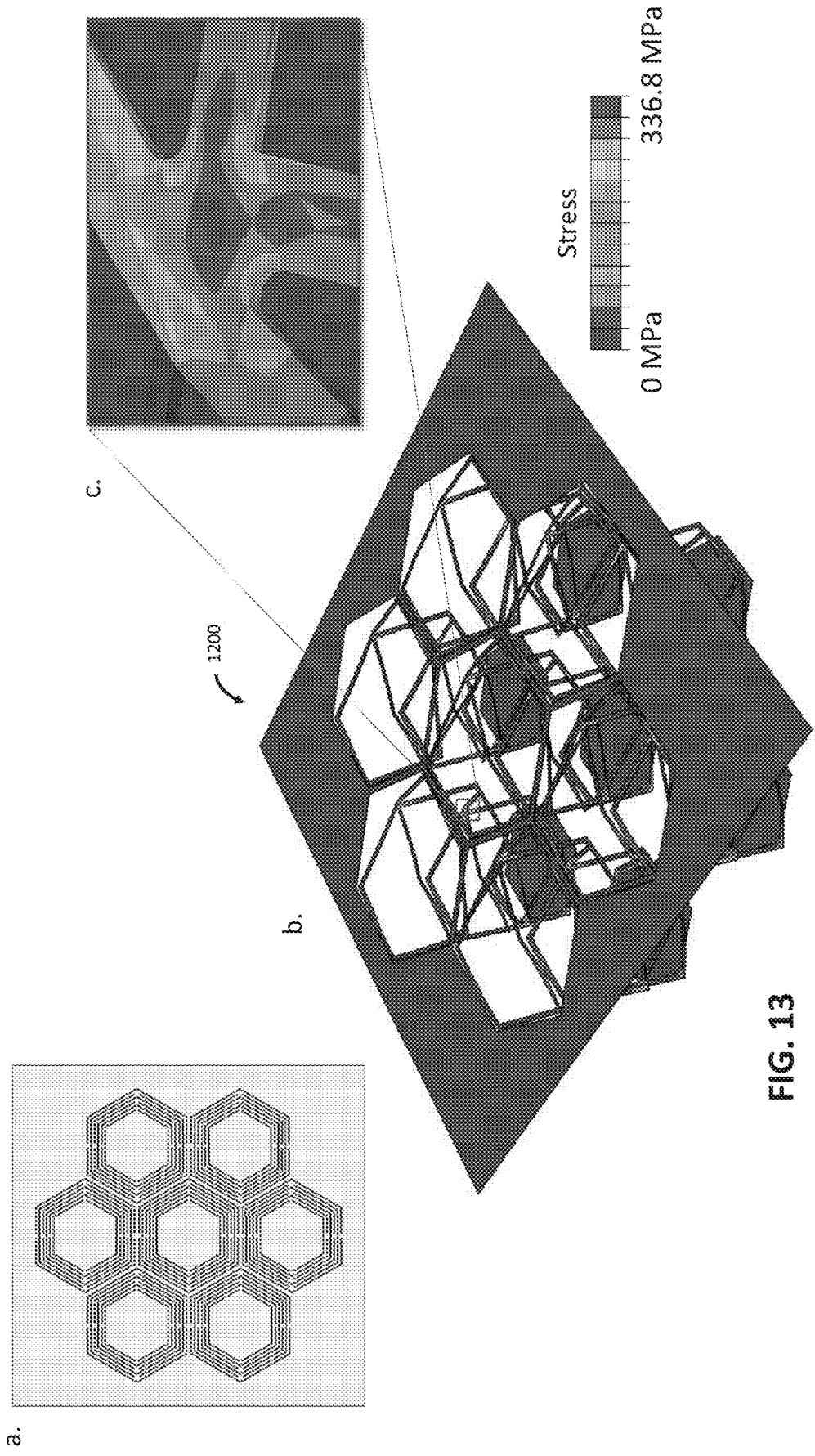
FIG. 13 illustrates an arrangement of kirigami-based hexagonal unit cells to create the array of FIG. 12 in accordance with one example.

FIG. 13 illustrates an example arrangement of the kirigami hexagonal unit cells to create the array 1200 of FIG. 12. The cut pattern is shown in FIG. 13*a* with minimal spacing between each unit cell. The simulated array 1200 is shown in FIG. 13*b*, where the greyscale map indicates the Von Mises Stress in megapascal (MPa). FIG. 13*c* shows a zoomed-in image at one of the ends of the cuts to demonstrate the localization of stress.

Figure 14:
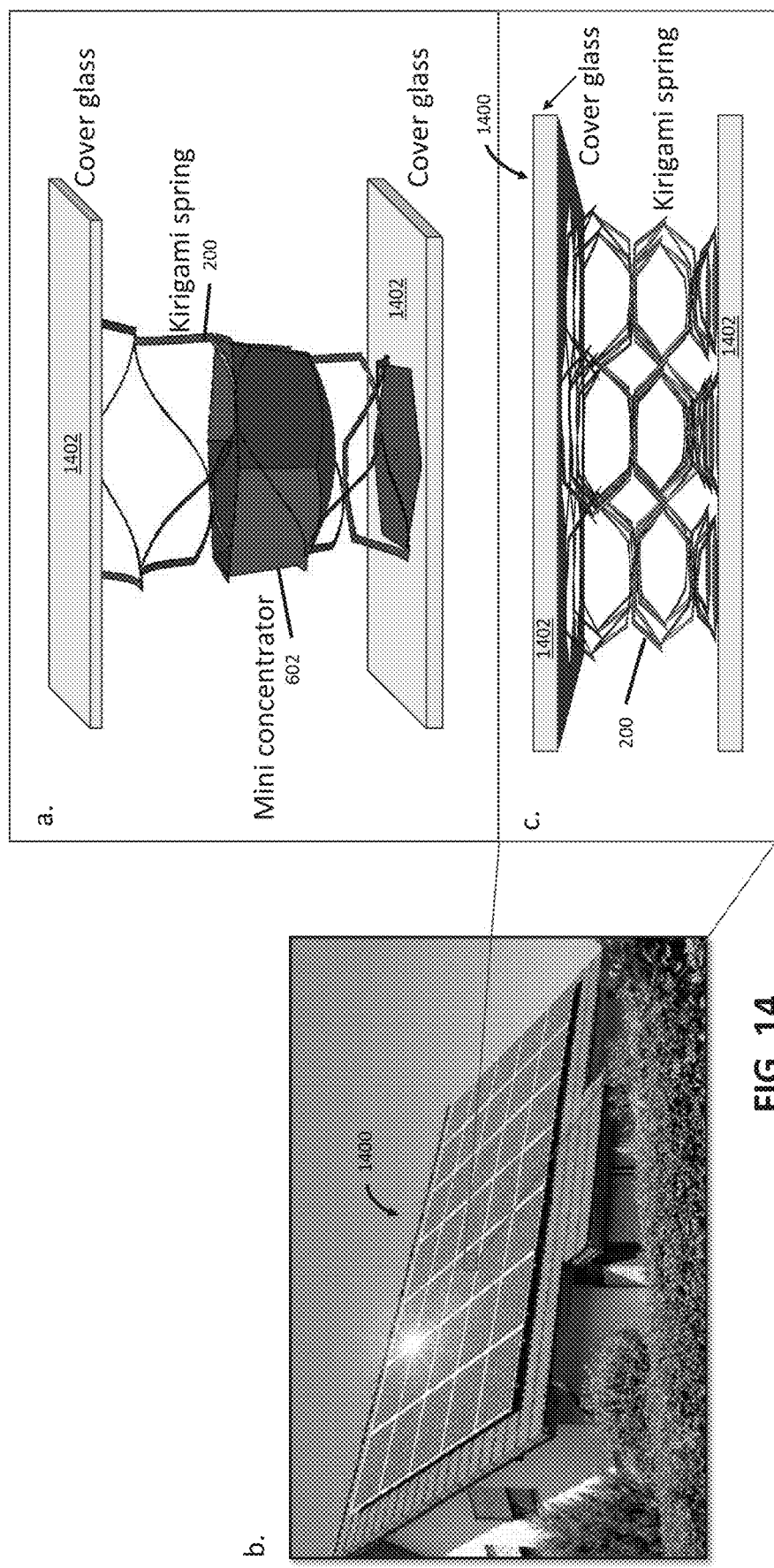
FIG. 14 illustrates a kirigami-based solar tracking system in outdoor conditions in accordance with one example.

FIG. 14 illustrates an example of a solar tracking system 1400 in outdoor conditions. As shown in FIG. 14*a*, the solar tracking device of the solar tracking system 1400 may include a kirigami spring 200 having a plurality of concentric cuts that define a cone-shaped structure. The solar tracking device may also include a concentrator 602 supported by a middle portion of the kirigami spring 200 and a solar sensor 604 (not shown) arranged in a central portion of the concentrator 602. The solar tracking device may also include a panel 1402 coupled to a top surface of the kirigami spring. In one example, the solar tracking device may include two panels 1402 or glass or UV-resistant plastic panes 1402 located on opposite sides of the system to protect the internal solar trackers (i.e., kirigami spring 200, concentrator 602, and solar sensor 604) from the environment, such as wind. In this example, a bottom portion of the kirigami spring 200 is configured to translate along a plane parallel to the panel 1402 in one or more lateral directions. The concentrator 602 and the solar sensor 604 may be configured to tilt at a tilt angle along one or more axes depending on a translation of the top or bottom portion of the kirigami spring 200, such that the solar sensor 604 is operable to track solar radiation or the position of the sun in the sky. The solar tracking system 1400 may be configured to be low-profile, such that the system 1400 may be placed on sloped residential rooftops, as shown in FIG. 14*b*. FIG. 14*c* shows a side view of the solar tracking system 1400. As seen in FIG. 14*c*, the array of solar trackers (i.e., kirigami spring support structures 200) is sandwiched between the impact-resistant and transparent glass 1402 or rigid plastic panes 1402 or covers 1402.

The spacing between each unit cell that makes up a kirigami array is a parameter for maximizing space utilization. For solar tracking applications, for instance, a trade-off exists between having the unit cells be spaced close enough to maximize the amount of space usable to harvest energy and having enough space between the cells such that the beams 206 of the adjacent support structures 200 do not overlap upon high shear (i.e., high tilt angle) and to minimize shadowing effects, as will be discussed below.

FIG. 15 illustrates two example kirigami arrays 1200 having different spacing parameters. FIG. 15*a* depicts a kirigami array 1200 with no spacing between each cell, whereas FIG. 15*b* has a 5 mm spacing between each cell. The arrows in FIG. 15*b* indicate the spacing between the cells.

Figure 16:
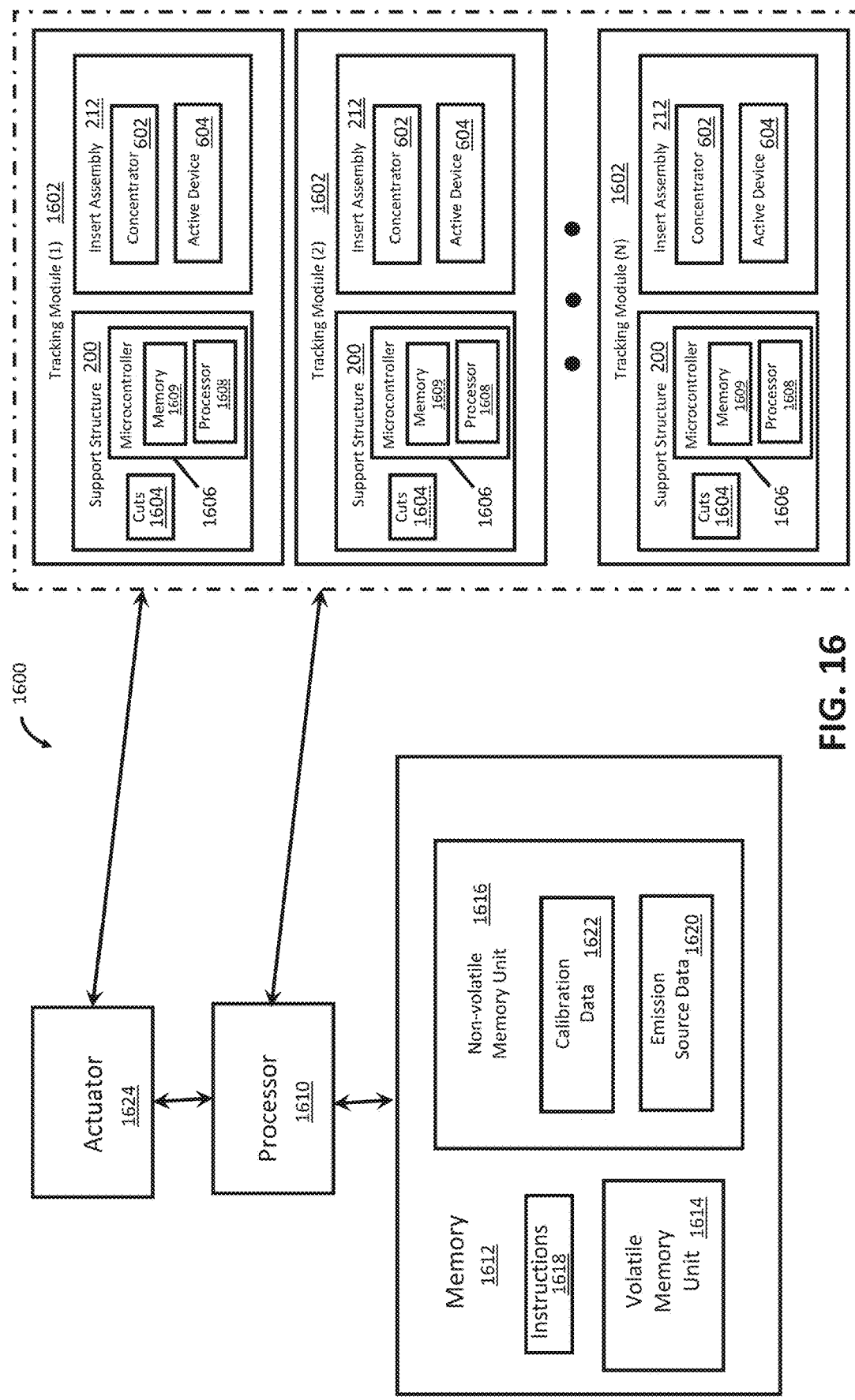
FIG. 16 is a block diagram of a kirigami-based tracking system in accordance with one example.

FIG. 16 is a block diagram of a kirigami-based tracking system 1600 in which the kirigami spring-like support structures 200 described herein may be deployed. The system 1600 may be directed to capturing solar energy to generate power.

The tracking system 1600 includes a tracking module 1602 that may be configured in accordance with any of the examples described herein. The tracking system 1600 may also include a plurality of tracking modules 1602. As described above, the tracking module 1602 includes a kirigami support structure 200 having a plurality of concentric cuts 1604 through the kirigami support structure 200. The kirigami support structure 200 has a base portion and a top portion parallel to the base portion. The tracking module 1602 further includes an insert assembly 212 supported by the kirigami support structure 200 between the top portion of the kirigami support structure 200 and the base portion of the kirigami support structure 200. The insert assembly 212 includes a concentrator 602 and an active device 604. The concentrator 602 may be a reflective device configured to concentrate emissions from a source to a focal point. The active device 604 may be positioned at the focal point and configured to capture the concentrated emissions. In one example, the active device 604 includes a photovoltaic cell.

The tracking system 1600 includes a processor 1610 and a memory 1612 in which instructions for configuring the processor 1610 are stored. The memory 1612 may be or include one or more memories. For example, the memory may include both volatile memory 1614 and non-volatile storage 1616. Tracking instructions 1618, emission source data 1620, and calibration data 1622 are stored in the memory 1612. The tracking system 1600 also includes an actuator 1624 coupled to the plurality of tracking modules 1602. Execution of the tracking instructions 1618 by the processor 1610 causes the actuator 1624 to displace the plurality of tracking modules 1602 based on the emission source data 1620 and calibration data 1622. In one example, the displacement of the plurality of tracking modules 1602 includes a lateral displacement of the base portion of the kirigami support structure 200 or the top portion of the kirigami support structure 200 in one or more lateral directions, such that the insert assembly 212 is operable to tilt along one or more axes.

As discussed above with respect to FIGS. 12 and 13, the plurality of tracking modules 1602 may be arranged in a honeycomb-like array 1200. In this example, the tracking system 1600 may further include a plurality of electrodes connecting respective active devices 604 and respective kirigami support structures 200 of the plurality of tracking modules 1602. The plurality of electrodes may be routed between adjacent cuts of the plurality of concentric cuts 1604 of the respective kirigami support structures 200. The plurality of electrodes may also be configured to transmit electricity generated by the respective active devices 604 of the plurality of tracking modules 1602.

In one example, as discussed above with respect to FIG. 14, the tracking system 1600 may further include a first transparent pane 1402 attached to the top portion of the kirigami support structure 200 and a second transparent pane 1402 attached to the base portion of the kirigami support structure 200.

In some cases, some of the data processing is implemented by a microcontroller or other processor integrated with the tracking module 1602. As shown in FIG. 16, the tracking module 1602 may include a microcontroller 1606 supported by the support structure 200. The microcontroller 1606 may include a processor 1608 and a memory 1609 on which similar tracking and/or other instructions are stored.

Figure 17:
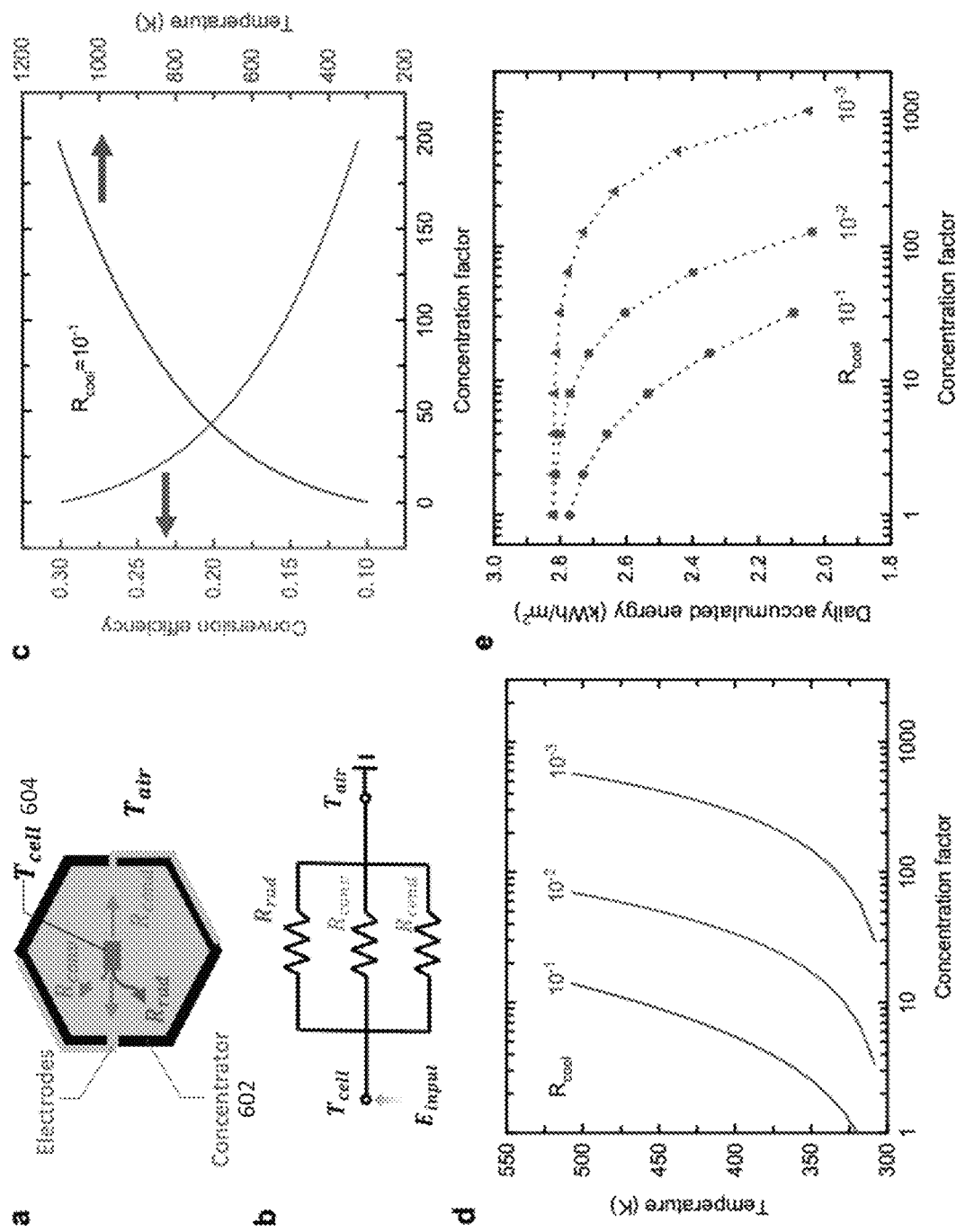
FIG. 17 illustrates theoretical thermal effects of a kirigami-based support structure and insert assembly in accordance with several examples.

FIG. 17 illustrates theoretical thermal effects of the disclosed kirigami support structure 200 and insert assembly 212. The design of the insert assembly 212 for solar energy harvesting application may be engineered to balance the concentration factor for economy of costly semiconductor material, required tolerances in alignment and tracking accuracy, and potential for excessive heating of the solar cell 604 that would adversely impact the power conversion efficiency. Focusing on heat dissipation, thermal radiation and convection from the PV cell 604 surface is expected, as well as thermal conduction by the electrodes as illustrated in FIG. 17a. The energy balance is governed by the Equations (2) and (3):

$$\phi \cdot A_{conc} = \varepsilon\sigma(T_{cell}^4 - T_{air}^4) \cdot 2A_{cell} + 2\Delta T \cdot \frac{1}{R_{cool}} \cdot A_{cell} + \eta \cdot \phi \cdot A_{conc} \quad (2)$$

$$\frac{1}{R_{cool}} = \frac{1}{R_{conv}} + \frac{1}{R_{wire}} \quad (3)$$

where $\Phi$, $A_{conc}$, $A_{cell}$, $\eta$, $\varepsilon$ denote the solar intensity, the area of the parabolic concentrator 602 and solar cell 604, power conversion efficiency, and hemispherical emissivity, respectively. The corresponding thermal circuit diagram is shown in FIG. 17b, which depicts the radiation, convection and conduction load. When the cooling resistance is equal to $10^{-1}$ K·m²/W, the dominant dissipation methods are radiation and natural convection. As the concentration factor increases, the cell 604 temperature increases.

Studies have shown that power conversion efficiency drops linearly with operating cell temperature, and the temperature coefficient of GaAs is $-0.08\%$ K$^{-1}$. This behavior is reflected in the prediction in FIG. 17c. If the cooling resistance is reduced to $10^{-2}$, the solar cell 604 can maintain a lower operating temperature, as shown by the parametric curves in FIG. 17d, and produce a higher daily accumulated energy as indicated in FIG. 17e. An order-of-magnitude increase in CF leads to an approximately 14% drop in the daily accumulated energy value, which can be countered by an order-of-magnitude decrease in thermal resistance, physically consistent with the energy balance. The practical maximum operating temperature is determined jointly by the material selection as well as by the economics of diminishing efficiency with high CF. In one example, thermoelectric materials may be used to help dissipate heat. In another example, the emissivity spectrum of the surface of the solar cell 604 may be altered. For instance, nanoscale or microscale patterns or coatings may be used on the front and/or back of the solar cell 604 to enhance thermal dissipation by radiative means. Referring back to FIG. 6, the insert device 604 of FIG. 6b, for example, may include a coating 606. In one example, the coating 606 may only be applied to the front or back of the device 604. In another example, the coating 606 may be applied to the entire device 604 (i.e., all surfaces). As discussed above, the coating 606 may include specific types of materials or patterns. For example, the coating 606 may include an anti-reflective coating so that the device 604 (e.g., solar cell 604) can absorb as much optical energy as possible, as opposed to reflecting optical energy away from the device 604. In this regard, in-coupling of light into the device 604 may be maximized. In another example, the coating 606 may include a wavelength-selective coating, where certain wavelengths are either accepted (i.e., admitted or received) into the device 604 or reflected away from the device 604 based on the wavelengths reaching the device 604. In this regard, the coating 606 may act as a band-pass filter.

Figure 18:
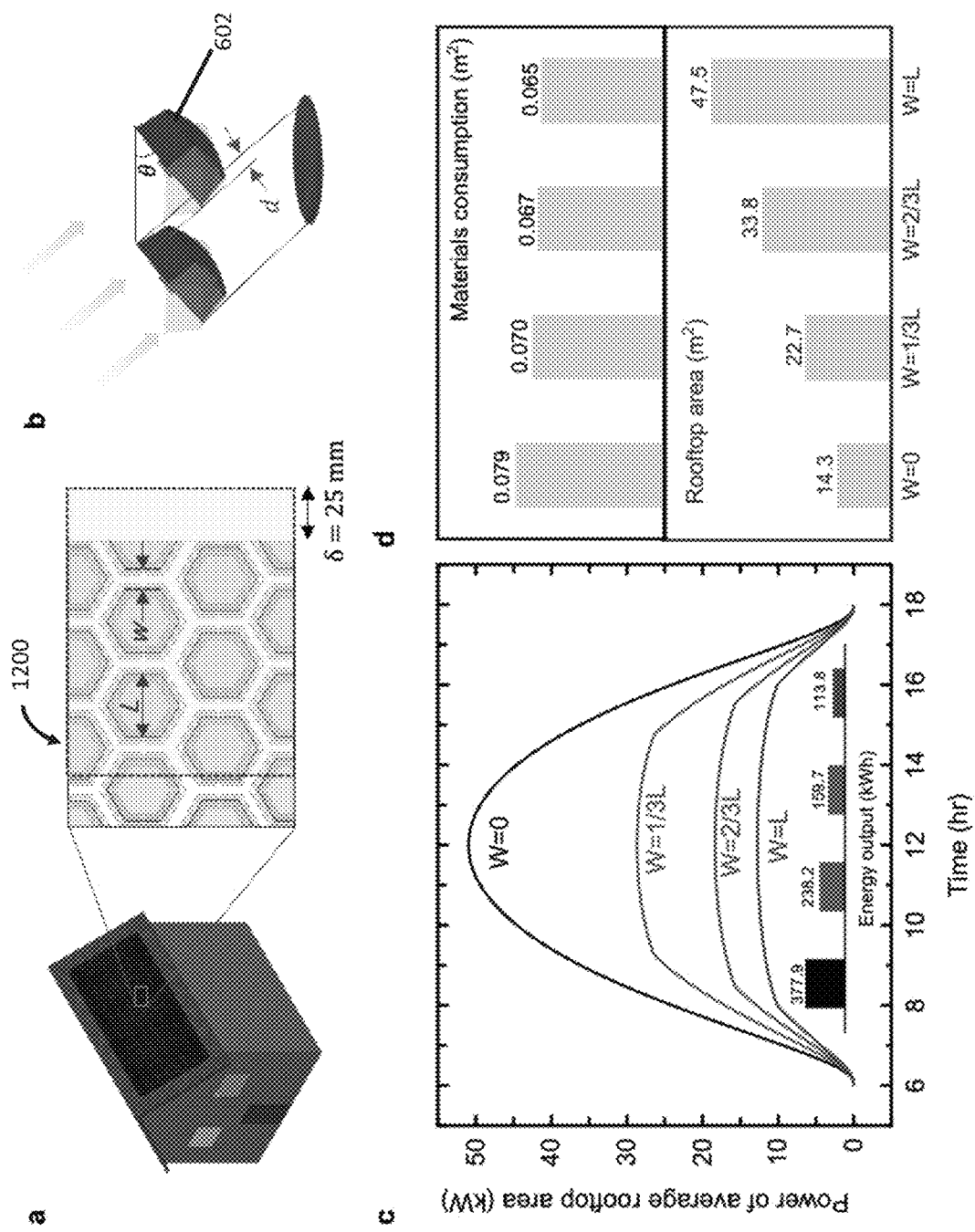
FIG. 18 illustrates the effect of shadowing on the performance of a kirigami-based solar tracking device and system in accordance with several examples.

FIG. 18 illustrates the effect of shadowing on the performance of the disclosed solar tracking devices and systems. While arranging the concentrators 602 in a hexagonal array 1200, as discussed above, allows a large collection area to be covered without increasing the vertical profile of the array 1200, as with any solar tracking system, there exists a trade-off between area utilization and shadowing caused by nearby concentrators 602. FIG. 18a is a schematic of an example solar array 1200 on the roof of a house and a close-up of the cut pattern array with shaded area representing the area extent of displacing the tracker by 25 mm. In FIG. 18a, L indicates the length of the concentrator 602 and W indicates the width between concentrators 602. A schematic of the side view of two nearby concentrators 602 that shadow each other are represented in FIG. 18b. Here, d signifies the shadowing area and $\theta_0$ is the critical angle when a shadow appears. The effective area changes based on the extent of the shadowing area and when $\theta_0 < \theta < \theta_{max}$. The governing equations below assume a to be the side of the concentrator 602, $A_{effect}$ the effective area, $A_{shad}$ the shadowing area, and $A_{total}$ the total area. We thus obtain:

$$A_{effect} = A_{total} - A_{shadow} \quad (4)$$

$$A_{effect} = \frac{\sqrt{3}}{2}L^2 - \frac{\sqrt{3}}{3}L \cdot [L - (L+W) \cdot \cos\theta] - \frac{\sqrt{3}}{6}[L - (L+W) \cdot \cos\theta]^2 \quad (5)$$

Derivations of the shadowing effect are described in more detail below with respect to FIG. 19.

According to Equation (5), increasing the spacing W between two concentrators 602 reduces the shadowing at the expense of rooftop area utilization. FIG. 18c illustrates this trade-off, showing total instantaneous power output produced by an average rooftop area, assuming the average rooftop area is 180 m², CF=182, and a fixed area for each concentrator 602 (e.g., 7.8 cm² if L≈30 mm). For a fixed panel area, increasing W decreases the total daily accumulated energy. To avoiding shadowing, the separation distance between concentrations must increase, reducing the number of concentrators 602 (and thus, sunlight collection area) in a fixed panel area. FIG. 18d depicts the area of semiconductor material and rooftop area needed to meet an exemplary average daily electricity requirement of 30 kWh. As a benchmark, a 20%-efficient, stationary silicon panel requires 22 m² of semiconductor. Using higher-efficiency (e.g., 29%) GaAs semiconductor PV cells reduces the semiconductor illuminated area requirement. This effect is multiplied by the use of the micro-concentrator 602 arrangement disclosed herein, provided that tracking and shadowing are mitigated. The latter is accomplished by increasing W, albeit increasing the total area occupied by the panel. Since the cost of semiconductor PV cells may dominate the panel's bill of materials for high efficiency PV panels, increasing W is beneficial to lowering the overall levelized cost of electricity, as the projections in FIG. 20 below suggest.

Figure 19:
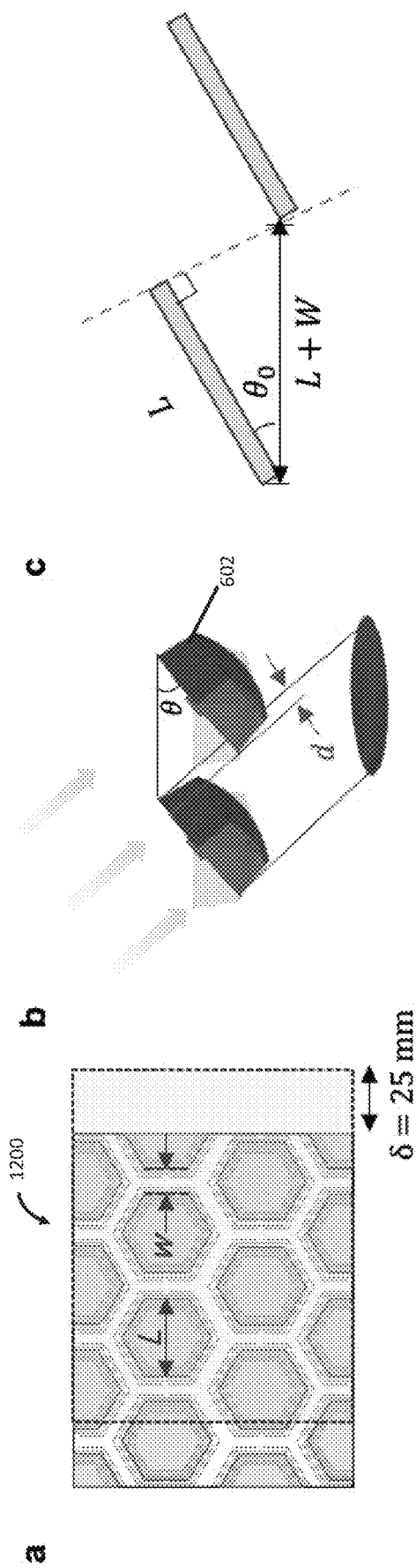
FIG. 19 are schematic views showing shadowing of nearby concentrators in accordance with one example.

FIG. 19 illustrates schematics showing shadowing of nearby concentrators 602. FIG. 19a shows a cut pattern array 1200 with shaded area representing the area extent of displacing the tracker by 25 mm. In this example, L represents the length of a concentrator 602 and W represents the width between adjacent concentrators 602. FIG. 19b shows a side view of packed (i.e., tightly spaced) neighbor concentrators 602, where $\theta$ is the tilt angle and d is the shadowing area. FIG. 19c shows a side view of two nearby concentrators 602 represented as rectangles, where $\theta_0$ represents the critical angle when a shadow appears.

Figure 20:
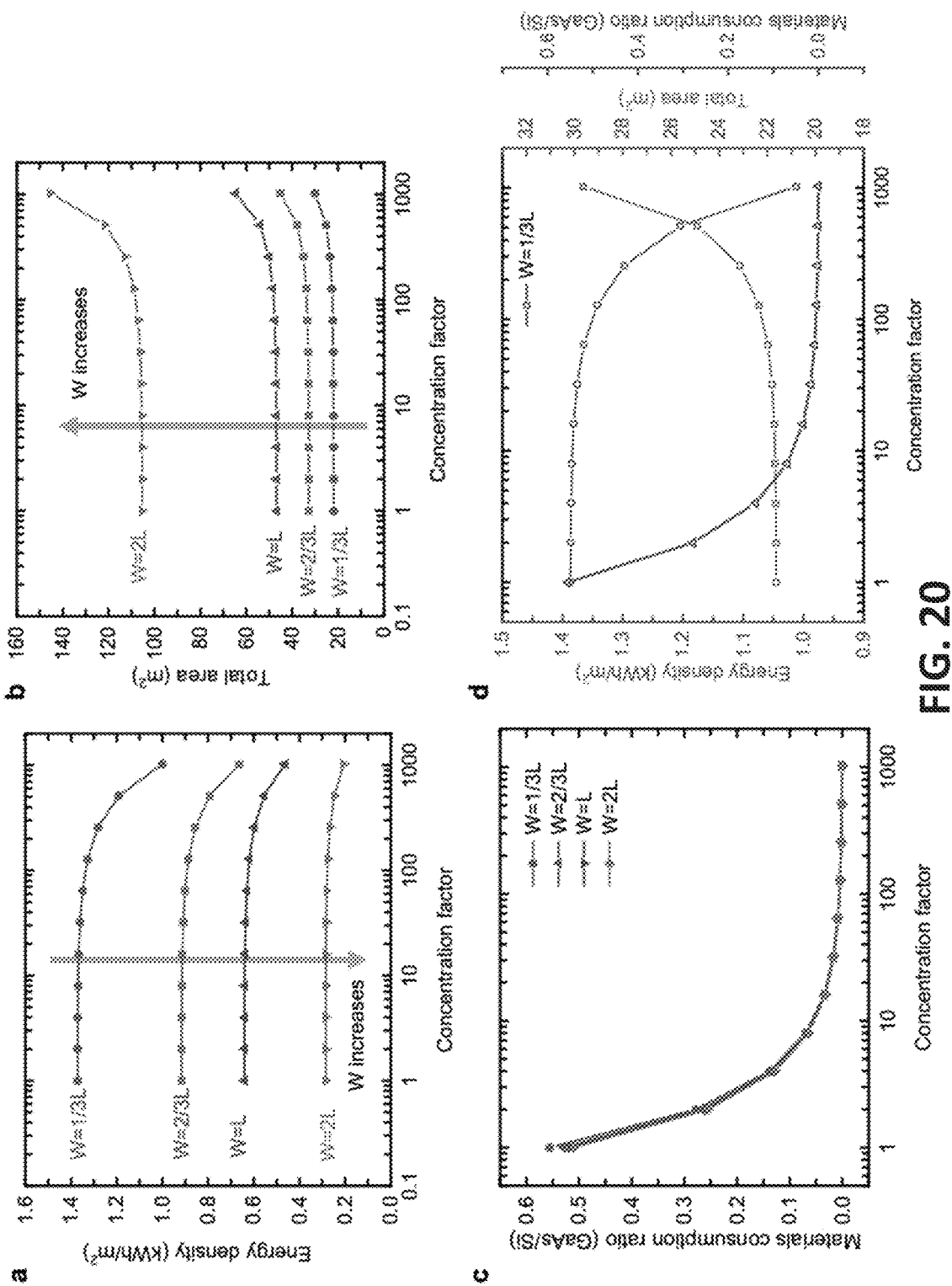
FIG. 20 depicts graphical plots of data showing how shadowing of concentrators and cell temperature influence energy density, area, and cost in accordance with several examples.

FIG. 20 illustrates how shadowing of concentrators 602 and cell 604 temperature influence energy density, area, and cost. In this example, a concentrator 602 maximum tilt angle θ=55°. FIG. 20a depicts energy density as a function of CF with varying W, i.e., the daily energy harvested per unit area of panel for varying CF and W, assuming $R_{cool}=10^{-3}$ $Km^2W^{-1}$. For a given CF, increasing W to reduce shadowing increases the amount of area needed to achieve the same energy output as shown by the curves in FIG. 20b. Nevertheless, the amount of semiconductor material needed to produce the daily output requirement decreases rapidly with CF, and diminishing returns occur beyond CF>20, as shown in FIG. 20c. If space is the most limiting factor for designing a tracker such as those disclosed herein, minimizing W may be useful. For example, taking W=⅓L at CF=50, (FIG. 20d) the required rooftop area for the panel fits easily within the typical available rooftop area, and only 0.246 m² of GaAs PV cells is required. This stands in favorable contrast to needing 21.9 m² of silicon PV cells to achieve the aforementioned daily electricity requirement. In other words, an 89× reduction in semiconductor area may be obtained, provided sufficient heat dissipation is achieved. Improved heat dissipation may be obtained using the lens insert described above with respect to FIGS. 7a and 7b with a corresponding solar cell 604 positioned in the focal area located on the base of the spring-like support structure 200. This configuration allows for obtaining higher concentration factors, for example, and/or improving the power conversion efficiency of the device 604. Given that a fraction of high efficiency PV panel cost attributed to the semiconductor can exceed 85%, these projected cost reductions are highly encouraging. Comparisons between dual-axis GaAs, single-axis GaAs, stationary GaAs, and stationary Si systems are shown in FIG. 21.

Figure 21:
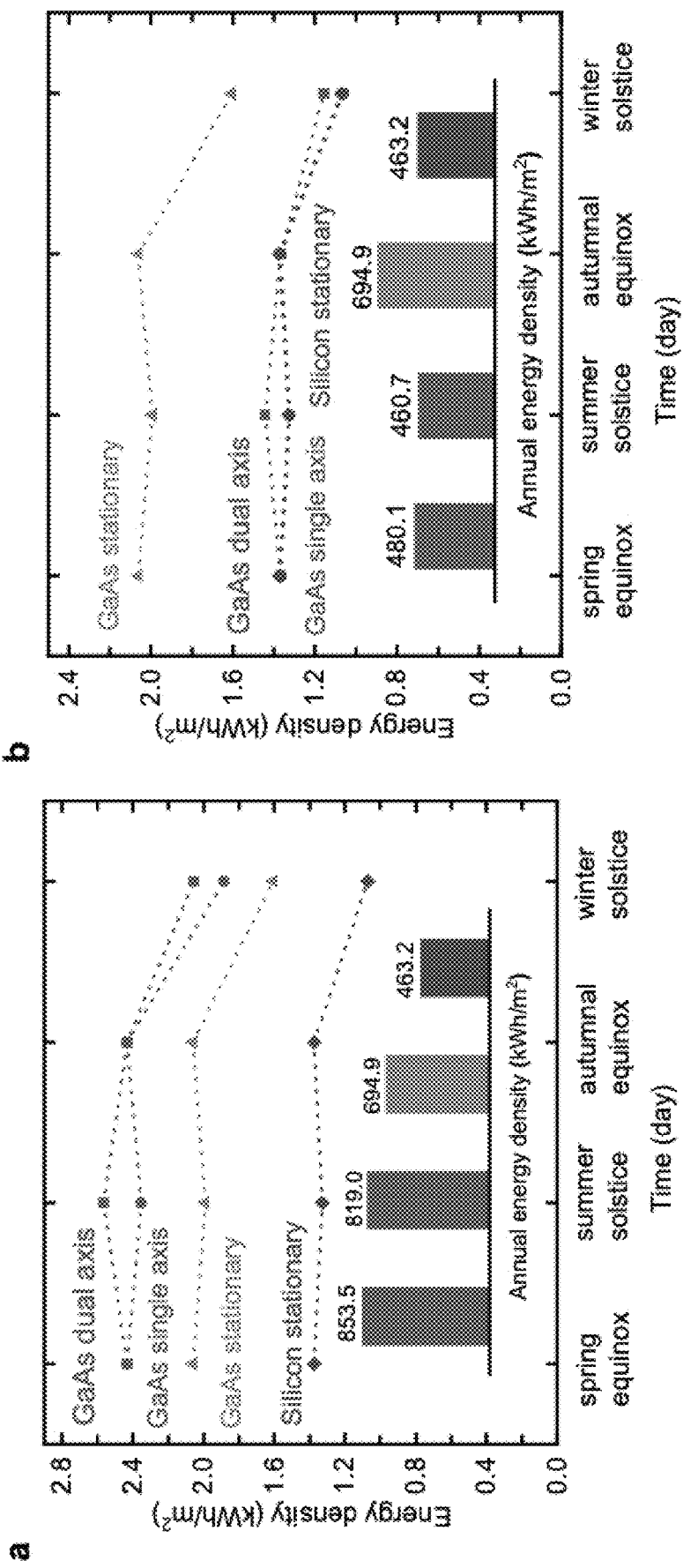
FIG. 21 depicts graphical plots of data showing a comparison of energy harvesting between four systems in accordance with several examples. The four systems include GaAs dual axis trackers, GaAs single axis trackers, GaAs stationary systems, and Silicon stationary systems.

FIG. 21 illustrates a comparison of energy harvesting between four systems. The four systems include GaAs dual axis trackers, GaAs single axis trackers, GaAs stationary systems, and Silicon stationary systems. The results shown in FIG. 21 assume an energy conversion efficiency of GaAs and Si equal to 30% and 20%, respectively. FIG. 21a shows energy accumulated by per area of unit cell on four notable days in one year representing extremes of sunlight availability given clear conditions. The inset of FIG. 21a shows energy density produced over the entire year. FIG. 21b shows energy accumulated by per area of solar panel. The inset of FIG. 21b shows energy density produced over the whole year.

Using practical dimensions, approximately 80-fold or even greater concentration can be realized using the disclosed kirigami spring tracking device, although considerably lower concentration factors can prove economically viable, too. The disclosed devices and systems have also addressed and overcome challenges associated with mutual shadowing of nearby concentrators 602 along with thermal effects of optical concentration that limit photovoltaic cell efficiency, and a substantial reduction in cost of solar photovoltaic panels compared to stationary panels in satisfying the household daily average energy requirement. Furthermore, the disclosed kirigami pattern's utility for solar tracking with mini-CPV application dramatically reduces the amount (and therefore cost and/or availability) of semiconductor material required.

For a variety of tracking applications, repeated displacement is expected, and it may be useful to know the force and work required to perform the movement, as well as the fatigue life of the structure. For this reason, the disclosed kirigami spring structural support 200 underwent various testing experiments. In one testing example, the kirigami spring structural support 200 was subjected to approximately 20 years' worth of use and showed promising results.

The kirigami patterns of the kirigami springs 200 disclosed herein may be fabricated by cutting polyethylene terephthalate (PET). The Young's Modulus and Poisson's ratio of film used may be 2.2 GPa and 0.37, respectively. The overall diameter of the patterns may be 70 mm with the largest cut radius at 27 mm. For the data collected in FIGS. 8 and 11, the overall diameter of the patterns was 48 mm. The kirigami spring support structure 200 may be fabricated and assembled as discussed above with respect to FIG. 6. As discussed above, other materials may be used for fabricating the kirigami spring support structure 200, such as thin metal films, laminates, as well as smart materials. In one example, the kirigami spring support structure 200 may be made from a metallic shape memory alloy (SMA) foil (see FIG. 25).

FIG. 22 illustrates testing results in accordance with one example of a hexagonal kirigami spring tilting mechanism. The baseline kirigami cut pattern used in this example consists nominally of discontinuous concentric hexagonal cuts as shown in the inset of FIG. 22b. Each hexagonal "ring" has two diametrically opposed splits rotated by 90° between each concentric set. The hexagonal pattern has an overall three-fold rotational symmetry about the central axis. When a force 202 is applied to the middle of the pattern along the $C_3$ rotational symmetry axis, as depicted in FIG. 22a, the 3-fold symmetry is broken. This creates s-shaped beams 206, which are connected via saddle-points 208 formed by the uncut regions, which provide structural continuity between the outer-most and inner-most hexagons. In the expanded structure, these become the "top"- and "bottom"-most horizontal members. When sliding these horizontal members parallel to each other, as depicted in FIG. 22a, the symmetry is further broken, causing the connecting beams 206 to tilt simultaneously. A close examination of the structure 200 in the side view reveals that previously aligned saddle-points 208 are located on the same cut perimeter in the middle ring. A red line connecting the two saddle points 208 that results in tilt angle, θ, is shown for clarity in FIG. 22a. The relationship between the angle θ and the lateral displacement, δ, is controlled by the geometry of the cuts and cross-plane displacement, z. Also shown in FIG. 22a is a top-view perspective, where the greyscale bar indicates the normalized Von Mises stress. Finite Element (FE) modeling shows the stress is concentrated in the cut ends, informing the placement of other elements within the structure with minimal risk of structural damage.

For the examples shown in FIG. 22, polyethylene terephthalate (PET) sheets 100 μm thick were laser-cut. θ as a function of δ was measured experimentally (FIG. 22b) showing a monotonic, approximately linear dependence, as discussed above. This dependence was applicable for the cut pattern shown in the inset of FIG. 22b in which there are two cuts per "ring", z=45 mm, the spacing between cuts is 1.5 mm, and the angular spacing is 6°. FIG. 22c shows the work required to shear the spring in the x-direction by 25 mm for up to 10,000 cycles, maintaining a height of 35 mm. As shown in FIG. 22c, to induce tilting, an average of 0.3 mJ are required over a lateral displacement from 0 to 25 mm for z=35 mm. Despite large global deformations, this range of δ is well within the linear elastic regime of the structure (see FIG. 23 for detailed results of shear and uniaxial tests). FIG. 22d shows an FE model of a deformed array 1200 arranged in a honeycomb pattern in the x-direction at δ=0 mm (left) and δ=25 mm (right) where z=35 mm, $L_c$=34 mm, t=6.8 mm, and l=6.8 mm. FIG. 22d shows the δ behavior as a function of θ incurs no hysteresis in the work required for a full cycle after performing 20,000 full cycles at a strain rate of 1 mm/s, indicating that minimal perceptible plastic deformation of the structure is taking place. Error bars are included for the control and 2,000 cycle cases. Deviations are attributed due to human error in re-aligning the substrate in 3D printed holders attached to tensile grips during shear tests, due to test apparatus limitations.

The individual-concentrator tracker assembly lends itself well to creating a low-profile array in which the motion of the individual actuators is intrinsically synchronized. FIG. 22d shows the top view of hexagonal concentrators 602 arranged in a honeycomb pattern and deformed such that z=35 mm at displacements of δ=0 mm and δ=25 mm. The side view of a physical array 1200 at δ=0 mm and δ=25 mm when z=35 mm are also shown in FIG. 22e, which shows the deformed physical array 1200 arranged in a rectangular pattern for visual clarity. Translating the top (or bottom) plane by 25 mm will induce the same maximum tilt angle for each of the concentrators 602. This means that the same amount of lateral translation is required whether the array 1200 is 0.01, 0.1, 1, 10, 100 m² or larger. In addition, the lightweight hexagonal kirigami pattern requires significantly less work to induce a desired tilt response compared to standard trackers. A drawback of many mechanical trackers and actuators in general is the parasitic energy loss due to the use of large mechanical motors, hinged joints, and moving mass required to tilt a photovoltaic panel or optical array. Standard trackers that rely on rotating the entire panel at once require more work and occupy a larger tracking region when increasing the size of the panel. They also often need heavy and bulky supports. For instance, if the kirigami-based tracker panel is 180 m², theoretically a total of approximately 0.04 kJ would be required to tilt all of the concentrators to 55°. In contrast, >13 kJ would be required by a 180-m² rectangular silicon panel with a mass density of 15.13 kg/m².

Figure 23:
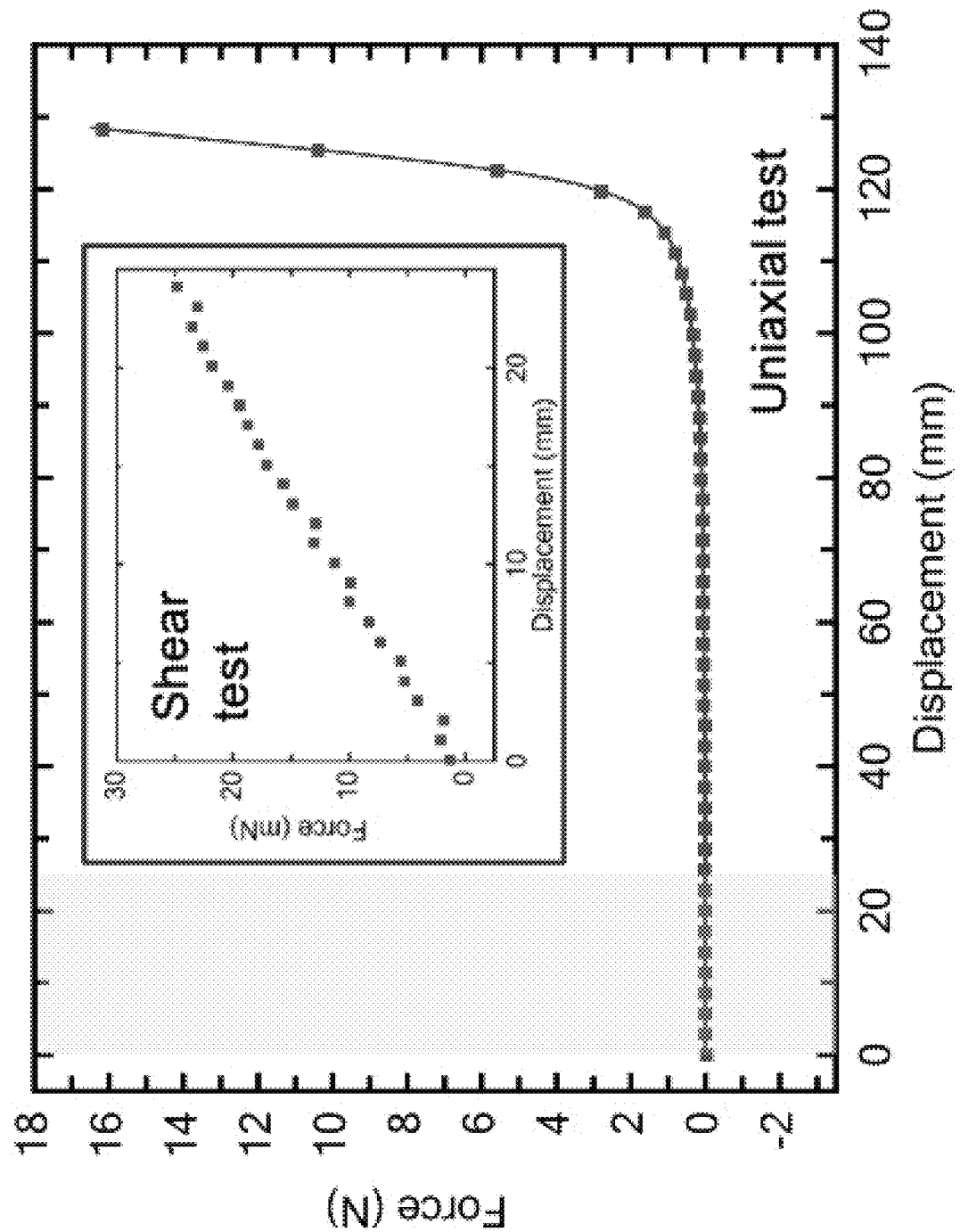
FIG. 23 is a graphical plot of data showing uniaxial and shear test results of a kirigami-based support structure in accordance with one example.

FIG. 23 illustrates uniaxial and shear test results of a support structure 200 in accordance with one example. FIG. 23 plots force versus displacement data of a support structure 200 (i.e., unit cell) undergoing uniaxial tensile testing. The inset of FIG. 23 also shows the unit cell undergoing shear testing along the x-direction.

Figure 24:
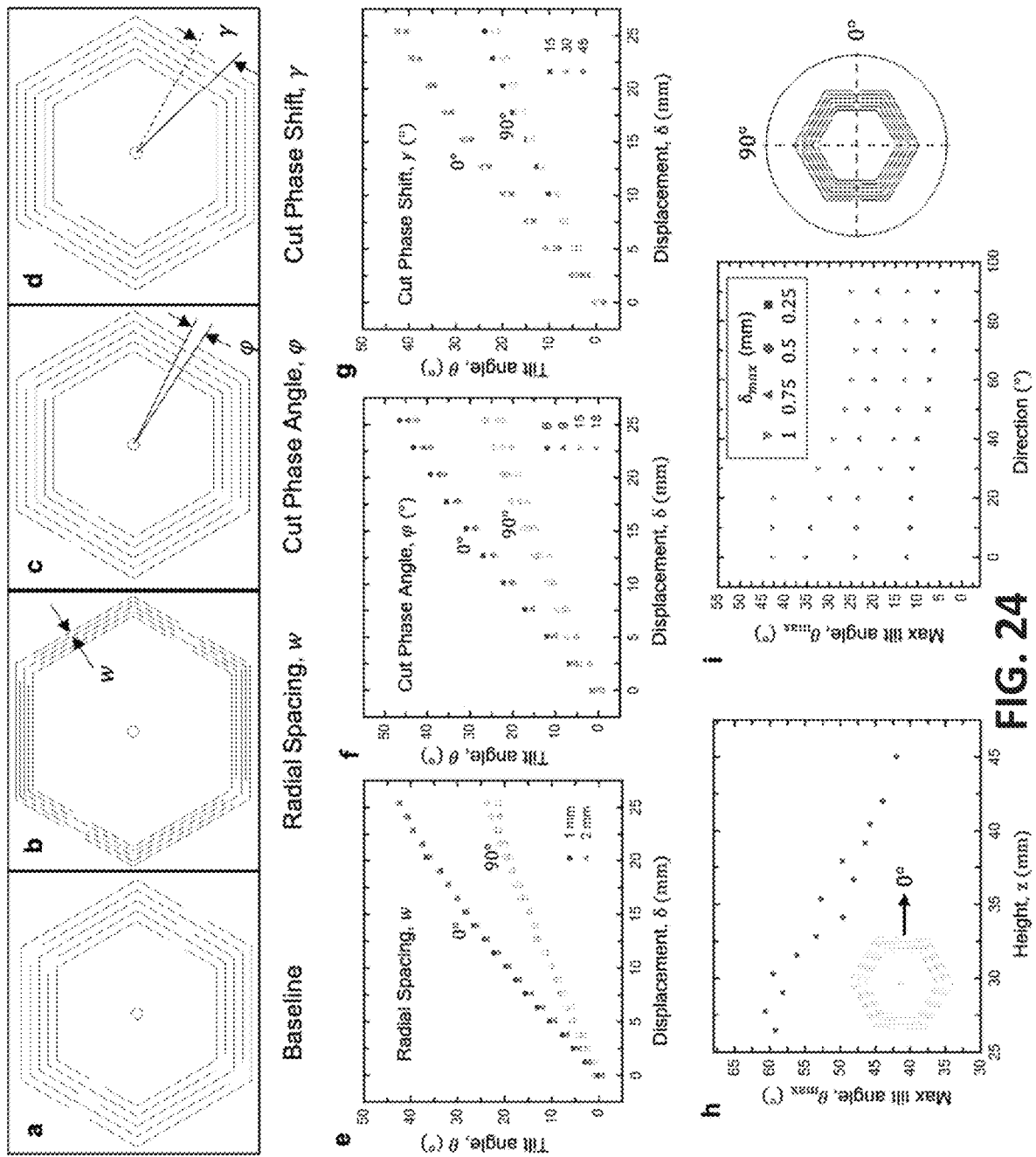
FIG. 24 depicts graphical plots of data showing additional effects of cut parameters on tilt angle and displacement in accordance with several examples.

FIG. 24 illustrates additional effects of cut parameters on tilt angle and displacement in accordance with one example. FIGS. 24a-d represent cut parameters, as discussed above with respect to FIG. 1. FIGS. 24e, f, and g represents θ as a function of δ varying w, φ, and γ, respectively, when displaced in the x- and y-directions. FIG. 24h represents $\theta_{max}$ as a function of z in the x-direction. FIG. 24i represents $\theta_{max}$ as a function of δ direction.

Figure 25:
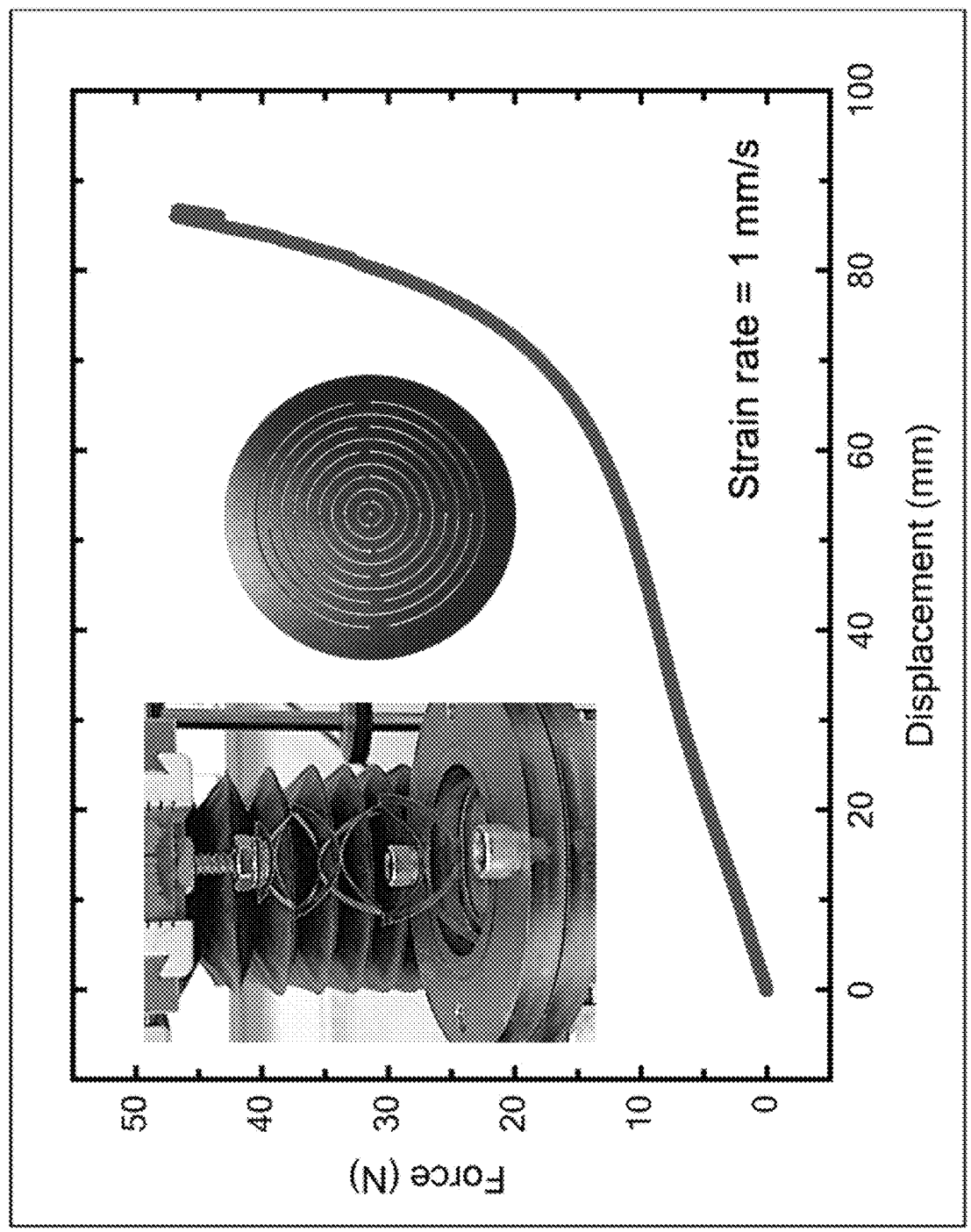
FIG. 25 is a graphical plot of data showing test results of force versus displacement for a kirigami-based support structure in accordance with one example.

FIG. 25 is a graphical plot of data showing test results of force versus displacement for a kirigami-based support structure 200 in accordance with one example. In the example shown in FIG. 25, the kirigami-based support structure 200 is made from a metallic shape memory alloy (SMA) foil.

Figure 26:
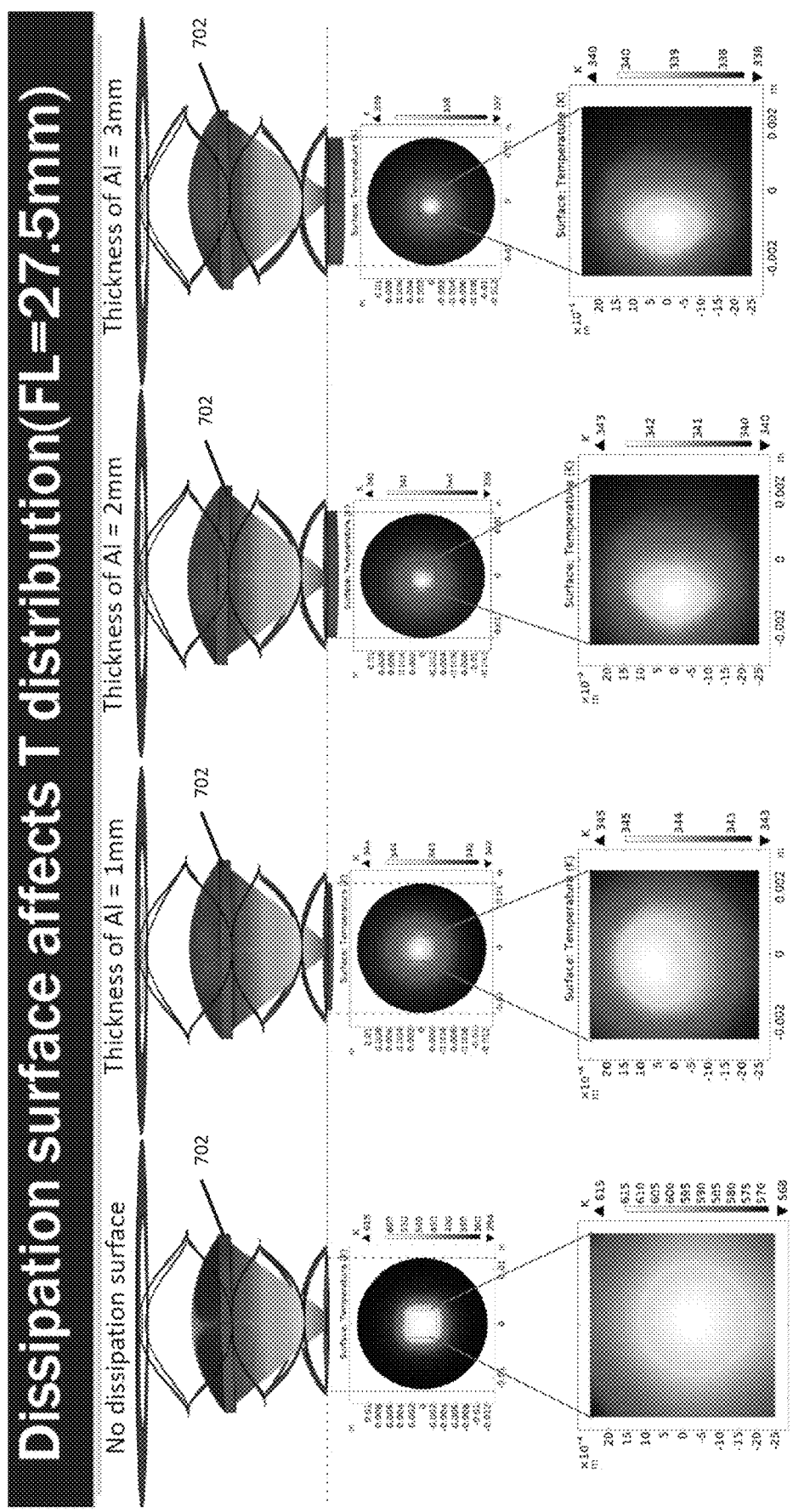
FIG. 26 illustrates dissipation surface effects of a kirigami-based support structure and lens insert assembly in accordance with several examples.

FIG. 26 illustrates dissipation surface effects of a kirigami-based support structure 200 and lens insert 702 assembly in accordance with one example. FIG. 26 shows simulations of light focusing and operating temperature of a cell 604 when it is mounted on an aluminum plate. As shown in FIG. 26, the operating temperature can be reduced substantially with the mounting plate acting as a heat sink.

Figure 27:
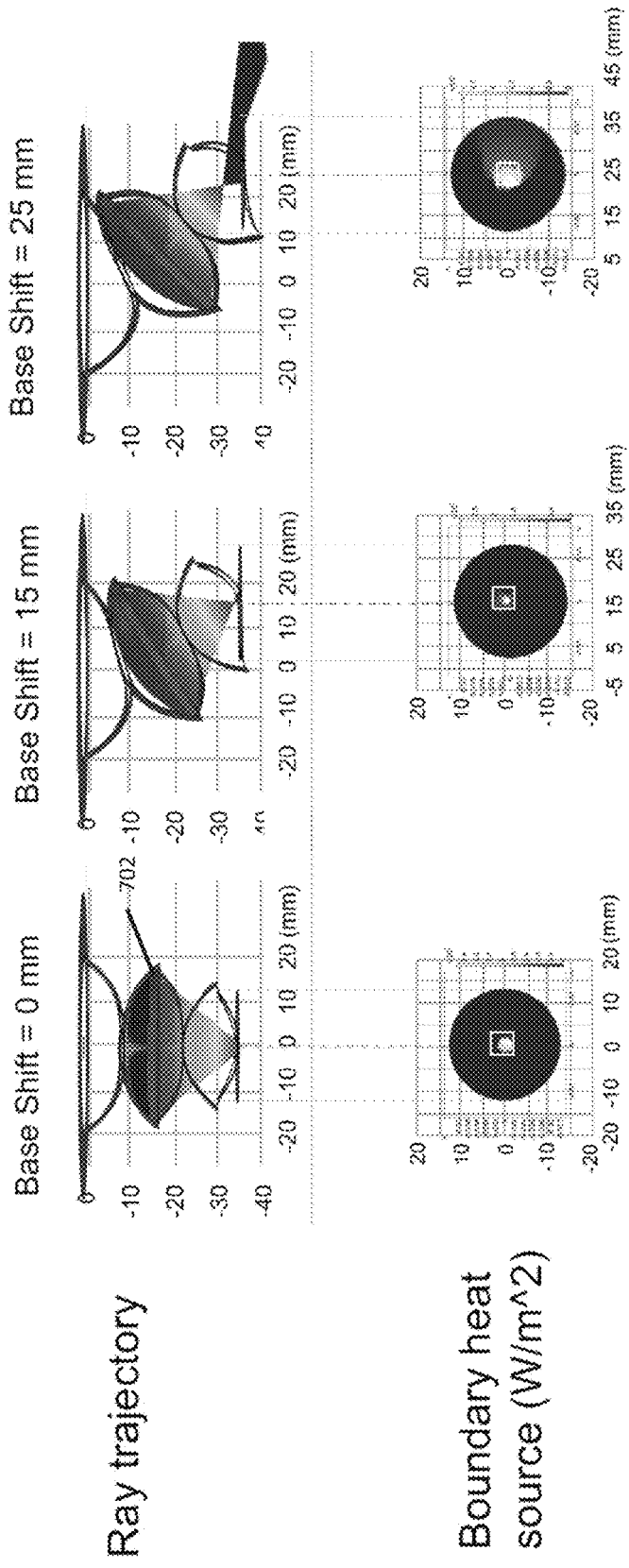
FIG. 27 illustrates ray focusing effects of a kirigami-based support structure and lens insert assembly in accordance with several examples.

FIG. 27 illustrates ray focusing effects of a kirigami-based support structure 200 and lens insert 702 assembly in accordance with one example. FIG. 27 shows ray focusing for 0 mm, 15 mm, and 25 mm relative shift between the top and bottom plates.

Figure 28:
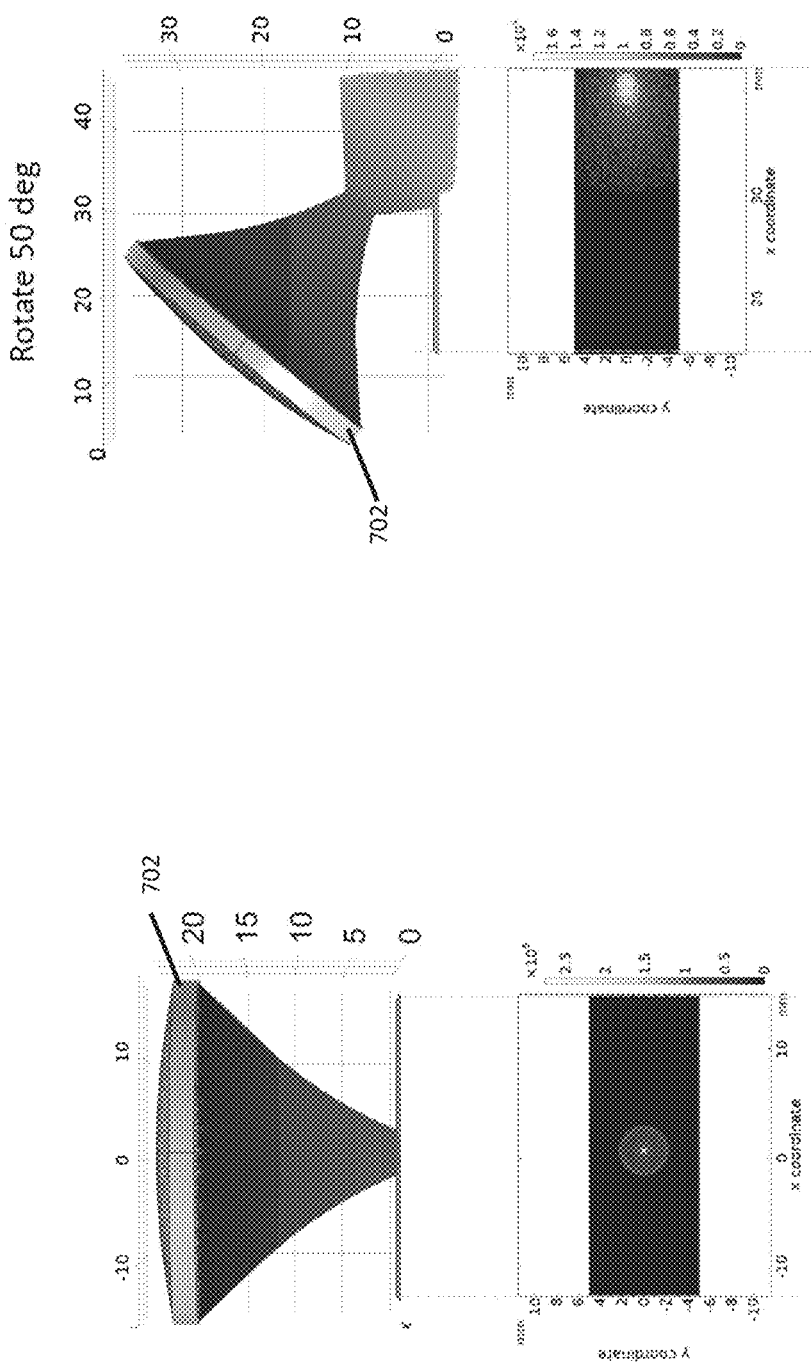
FIG. 28 illustrates focal area shift of a lens insert assembly in accordance with one example.

FIG. 28 illustrates focal area shift of a lens insert 702 assembly in accordance with one example. FIG. 28 shows the amount of focal spot, or focal area, shift for a 50-degree lens tilt.

The kirigami spring-like support structure 200 described herein may be used to improve multi-axis tracking mechanisms and their application as scalable solar tracking arrays. For example, each kirigami spring-like support structure 200 and corresponding concentrator 602 or lens 702 may be miniaturized such that an array 1200 of devices may be as small or smaller than a cell phone. In another example, each kirigami spring-like support structure 200 and corresponding concentrator 602 or lens 702 may be 10 feet across, or more. The design parameters for achieving the desired tracking application requirements were discussed above with respect to FIG. 5. To demonstrate tracking ability, a mini concentrator 602 combined with a photodiode is placed within a deformed kirigami spring 200, and the concentrator 602 tilts according to the displacement vector. High optical performance is maintained upon variations in the light-source angle whereby the concentrator 602 matches the tilt angle through a corresponding lateral δ. Thermal dissipation and shadowing of nearby concentrators 602 were calculated to influence the efficiency of solar electricity production and help guide the optimization of the concentrator 602 and tracker design for solar-energy harvesting applications. The disclosed kirigami tracking mechanism provides an alternative tracking method where cost is a factor and a small lateral displacement is necessary to uniformly induce tilting for a scaled array 1200. The combination of the kirigami tracking mechanism and wide-angle microcell concentrators 602 with high-efficiency solar cells 604 and sufficient cooling, or the combination of the kirigami tracking mechanism and insert lenses 702, may help enable widespread adoption of rooftop solar systems. The mechanical behavior described above enables a number of other applications, both purely mechanical in nature (e.g. a suspension or positioner design) as well as multi-functional via integration with other components and materials.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clarity of understanding only, and no unnecessary limitations should be understood therefrom, as modifications within the scope of the invention may be apparent to those having ordinary skill in the art.

What is claimed is:

1. A device comprising:
   a support structure having a plurality of concentric cuts through the support structure that define a set of structure sections; and
   an insert assembly supported by the support structure at an inner structure section of the set of structure sections, the inner structure section being disposed between two substantially parallel outer structure sections of the set of structure sections,
   wherein the inner structure section is configured to tilt the insert assembly at a tilt angle in accordance with a displacement along a plane of a first outer structure section of the two substantially parallel outer structure sections, and wherein the insert assembly is configured to tilt along one or more axes based on a deformation of the inner structure section.

2. The device of claim 1, wherein the first outer structure section is configured to be displaced in one or more lateral directions, and wherein the inner structure section is configured to be deformed based on a displacement of the first outer structure section.

3. The device of claim 2, wherein the first outer structure section is planar shaped and wherein the one or more lateral directions are along the plane of the first outer structure section.

4. The device of claim 1, further comprising a second outer structure section of the two substantially parallel outer structure sections, the second outer structure section being substantially parallel to the first outer structure section.

5. The device of claim 4, wherein the first or second outer structure section is a fixed outer structure section and the other outer structure section of the first or second outer structure section is configured to be displaced in one or more lateral directions relative to the fixed outer structure section.

6. The device of claim 1, wherein the insert assembly is configured to tilt to perform optical tracking.

7. The device of claim 6, wherein the optical tracking is solar tracking.

8. The device of claim 1, wherein the insert assembly comprises an active device and a concentrator, the concentrator being a reflective device configured to concentrate emissions from a source to a focal point.

9. The device of claim 8, wherein the active device of the insert assembly is positioned at the focal point and configured to capture the concentrated emissions.

10. The device of claim 8, wherein the concentrator and the plurality of concentric cuts have a common central axis.

11. The device of claim 8, wherein a geometry of the concentrator corresponds to a geometry of the inner structure section, such that the inner structure section is configured to receive the concentrator.

12. The device of claim 1, wherein the support structure comprises a compliant mechanism having a collapsible cone-like spring structure.

13. The device of claim 8, wherein the active device comprises a photovoltaic cell.

14. The device of claim 1, wherein the insert assembly comprises an emission device and a reflector, the reflector being a reflective device configured to reflect emissions from the emission device.

15. The device of claim 14, wherein the emission device comprises a light emitting diode.

16. The device of claim 14, wherein the emission device comprises an acoustic transmitter.

17. The device of claim 1, wherein the insert assembly comprises a lens, the lens being configured to focus emissions from a source to a focal area.

18. The device of claim 17, further comprising an active device positioned at the focal area and configured to capture the focused emissions.

19. The device of claim 18, wherein the focal area is positioned on the first outer structure section.

20. A tracking system comprising:
a processor;
a memory in which tracking instructions, emission source data, and calibration data are stored;
a plurality of tracking modules, each tracking module of the plurality of tracking modules comprising:
a kirigami support structure having a plurality of concentric cuts through the kirigami support structure, the kirigami support structure having a base portion and a top portion parallel to the base portion; and
an insert assembly supported by the kirigami support structure between the top portion of the kirigami support structure and the base portion of the kirigami support structure, the insert assembly being operable to tilt based on a displacement along a plane of the base portion of the kirigami support structure or the top portion of the kirigami support structure, the insert assembly comprising a concentrator and an active device, the concentrator being a reflective device configured to concentrate emissions from a source to a focal point, wherein the active device is positioned at the focal point and configured to capture the concentrated emissions; and
an actuator coupled to the plurality of tracking modules, wherein execution of the tracking instructions by the processor causes the actuator to displace the plurality of tracking modules based on the emission source data and calibration data.

21. The tracking system of claim 20, wherein the displacement of the plurality of tracking modules comprises a lateral displacement of the base portion of the kirigami support structure or the top portion of the kirigami support structure in one or more lateral directions, such that the insert assembly is operable to tilt along one or more axes.

22. The tracking system of claim 20, further comprising a plurality of electrodes connecting respective active devices and respective kirigami support structures of the plurality of tracking modules, the plurality of electrodes being routed between adjacent cuts of the plurality of concentric cuts of the respective kirigami support structures.

23. The tracking system of claim 22, wherein the active device comprises a photovoltaic cell, and wherein the plurality of electrodes are configured to transmit electricity generated by the respective active devices of the plurality of tracking modules.

24. The tracking system of claim 20, further comprising a first transparent pane attached to the top portion of the kirigami support structure and a second transparent pane attached to the base portion of the kirigami support structure.

25. A solar tracking device comprising: a kirigami spring having a plurality of concentric cuts that define a cone-shaped structure;
a concentrator supported by a middle portion of the kirigami spring;
a solar sensor arranged in a central portion of the concentrator; and
a panel coupled to a top surface of the kirigami spring, wherein a bottom portion of the kirigami spring is configured to translate along a plane parallel to the panel in one or more lateral directions,
wherein the concentrator and the solar sensor are configured to tilt at a tilt angle along one or more axes depending on a translation of the bottom portion of the kirigami spring and based on a deformation of the middle portion of the kirigami spring, such that the solar sensor is operable to track solar radiation.

\* \* \* \* \*